(12) United States Patent
Nagata et al.

(10) Patent No.: US 8,185,616 B2
(45) Date of Patent: May 22, 2012

(54) ROUTE DESIGNING METHOD

(75) Inventors: Akira Nagata, Kawasaki (JP); Hitoshi Ueno, Kawasaki (JP); Keiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1033 days.

(21) Appl. No.: 10/869,151

(22) Filed: Jun. 16, 2004

(65) Prior Publication Data
US 2005/0154790 A1 Jul. 14, 2005

(30) Foreign Application Priority Data
Jan. 13, 2004 (JP) ................................. 2004-005930

(51) Int. Cl.
G06F 15/173 (2006.01)
(52) U.S. Cl. ......................... 709/223; 709/224; 709/238
(58) Field of Classification Search .................. 709/238, 709/223, 224
See application file for complete search history.

(56) References Cited

U.S. PATENT DOCUMENTS

| | | | | |
|---|---|---|---|---|
| 5,274,643 A * | 12/1993 | Fisk | ................ | 370/238 |
| 5,432,790 A * | 7/1995 | Hluchyj et al. | ................ | 370/412 |
| 5,854,903 A * | 12/1998 | Morrison et al. | ............. | 709/249 |
| 5,881,050 A * | 3/1999 | Chevalier et al. | ............. | 370/230 |
| 6,011,804 A * | 1/2000 | Bertin et al. | ................... | 370/468 |
| 6,072,772 A * | 6/2000 | Charny et al. | .................... | 370/229 |
| 6,108,304 A * | 8/2000 | Abe et al. | ........................ | 370/232 |
| 6,219,547 B1 * | 4/2001 | Qaddoura et al. | ......... | 455/432.1 |
| 6,252,853 B1 * | 6/2001 | Ohno | ............................ | 370/242 |
| 6,256,309 B1 * | 7/2001 | Daley et al. | .............. | 370/395.43 |
| 6,331,986 B1 * | 12/2001 | Mitra et al. | ................... | 370/468 |
| 6,347,078 B1 * | 2/2002 | Narvaez-Guarnieri et al. | ............................. | 370/230 |
| 6,400,681 B1 * | 6/2002 | Bertin et al. | ................... | 370/218 |
| 6,418,139 B1 * | 7/2002 | Akhtar | .......................... | 370/356 |
| 6,539,432 B1 * | 3/2003 | Taguchi et al. | ............... | 709/227 |
| 6,628,670 B1 * | 9/2003 | Galand et al. | ................. | 370/468 |
| 6,647,008 B1 * | 11/2003 | Galand et al. | ................. | 370/389 |
| 6,711,125 B1 * | 3/2004 | Walrand et al. | ............... | 370/223 |
| 6,826,568 B2 * | 11/2004 | Bernstein et al. | ............. | 707/749 |

(Continued)

FOREIGN PATENT DOCUMENTS

EP 9-52741 A3 10/1999

(Continued)

OTHER PUBLICATIONS

Notice of Reason for Rejection dated Mar. 3, 2009, from the corresponding Japanese Application.

(Continued)

*Primary Examiner* — Emmanuel L Moise
*Assistant Examiner* — Waseem Ashraf
(74) *Attorney, Agent, or Firm* — Katten Muchin Rosenman LLP

(57) ABSTRACT

A route designing method in which there is accepted an input of user information containing information about bandwidth of an access link serving as a link for connecting each of user sites to a relay node, and information showing the relay node connecting to the user site via the access link, topology information of a network for relaying the communications between the user sites is acquired, a communication relay port and a communication non-relay port are obtained based on the user information and the topology information, an upper limit of the communication bandwidth available for the user on the communication relay port is obtained, a route design so that the user sites are connected by a tree-shaped route is performed, and a result of the route design is outputted.

22 Claims, 40 Drawing Sheets

U.S. PATENT DOCUMENTS

| | | | |
|---|---|---|---|
| 7,002,917 B1 * | 2/2006 | Saleh | 370/238 |
| 7,046,630 B2 * | 5/2006 | Abe et al. | 370/232 |
| 7,047,311 B2 * | 5/2006 | Oishi et al. | 709/233 |
| 7,324,553 B1 * | 1/2008 | Varier et al. | 370/468 |
| 2003/0103450 A1 * | 6/2003 | Chapman et al. | 370/229 |
| 2003/0120651 A1 * | 6/2003 | Bernstein et al. | 707/6 |
| 2003/0217129 A1 * | 11/2003 | Knittel et al. | 709/223 |
| 2004/0042402 A1 * | 3/2004 | Galand et al. | 370/237 |
| 2004/0047300 A1 * | 3/2004 | Enomoto et al. | 370/256 |
| 2004/0073933 A1 * | 4/2004 | Gollnick et al. | 725/81 |
| 2005/0038909 A1 * | 2/2005 | Yoshiba et al. | 709/241 |
| 2005/0068964 A1 * | 3/2005 | Wright et al. | 370/395.21 |
| 2007/0008884 A1 * | 1/2007 | Tang | 370/230 |
| 2007/0204021 A1 * | 8/2007 | Ekl et al. | 709/223 |
| 2008/0080369 A1 * | 4/2008 | Sumioka et al. | 370/229 |

FOREIGN PATENT DOCUMENTS

| | | |
|---|---|---|
| EP | 952741 A2 * | 10/1999 |
| JP | 9-083546 | 3/1997 |
| JP | 2002-141392 | 5/2002 |
| JP | 2003-69635 | 3/2003 |

OTHER PUBLICATIONS

Akira Nagata, et al. "VLAN Design Algorithm for Transparent LAN Service with MSTP", The Institute of Electronics, Information and Communication Engineers, Technical Report of IEICE, vol. 102, No. 694, Feb. 28, 2003, pp. 145-148.

* cited by examiner

FIG. 4

| NODE ID | PORT ID | POINT-TO-POINT LINK NODE ID | LINK BAND |
|---|---|---|---|
| N1 | 1 | N2 | 10000 |
| | 2 | N4 | 10000 |
| N2 | 1 | N1 | 10000 |
| | 2 | N3 | 10000 |
| | 3 | N5 | 10000 |
| N3 | 1 | N2 | 10000 |
| | 2 | N6 | 10000 |
| N4 | 1 | N1 | 10000 |
| | 2 | N5 | 10000 |
| N5 | 1 | N2 | 10000 |
| | 2 | N4 | 10000 |
| | 3 | N6 | 10000 |
| N6 | 1 | N3 | 10000 |
| | 2 | N5 | 10000 |

FIG. 5

| BASE-POINT NODE ID | BASE-POINT ACCOMMODATION NODE ID | SUBSCRIPTION BAND |
|---|---|---|
| 101 | N1 | 10 |
| 102 | N1 | 10 |
| 103 | N3 | 5 |
| 104 | N4 | 20 |
| 105 | N6 | 20 |

FIG. 7

| VLAN ID | NODE ID | TRANSFERABLE PORT ID | ALLOCATED OUTPUT RATE |
|---|---|---|---|
| A | N1 | 1 | 20 |
| | N2 | 1 | 20 |
| | | 2 | 5 |
| | | 3 | 20 |
| | N3 | 1 | 5 |
| | N4 | 2 | 20 |
| | N5 | 1 | 20 |
| | | 2 | 20 |
| | | 3 | 20 |
| | N6 | 2 | 20 |

FIG. 9
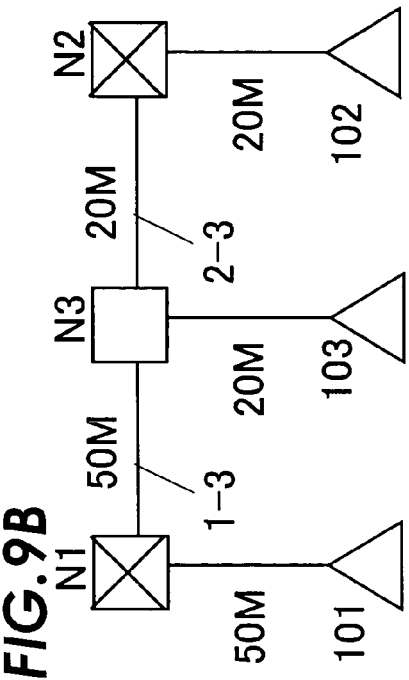
FIG.9A
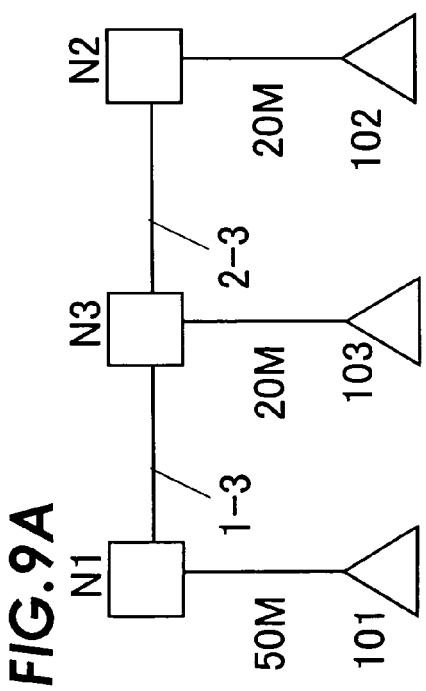
FIG.9C
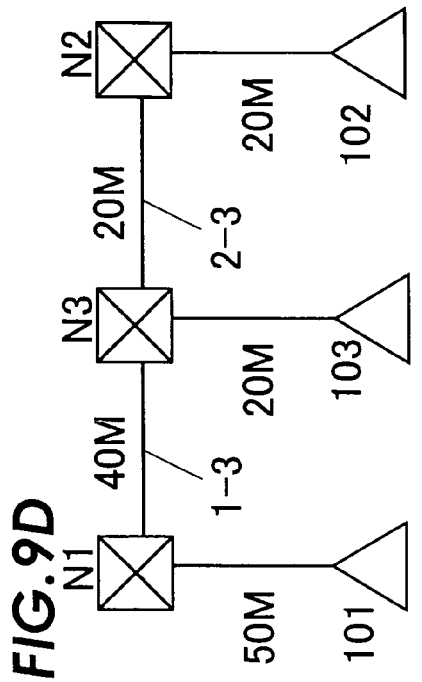
FIG.9B
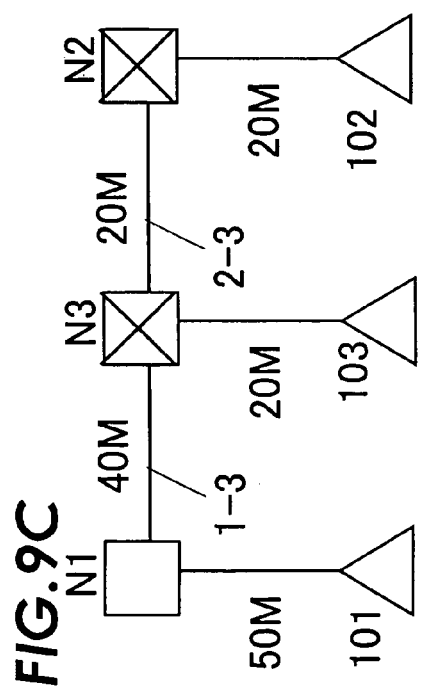
FIG.9D

FIG. 11

| BASE-POINT NODE ID | BASE-POINT ACCOMMODATION NODE ID | SUBSCRIPTION BAND |
|---|---|---|
| 101 | N1 | 40 |
| 102 | N3 | 10 |
| 103 | N4 | 30 |
| 104 | N6 | 10 |

FIG. 12  EXAMPLE OF A SHORTEST ROUTE TREE

FIG. 14

| NODE ID | PORT ID | POINT-TO-POINT LINK NODE ID | BAND |
|---|---|---|---|
| N1 | 1 | N2 | 10000 |
| | 2 | N4 | 10000 |
| | 3 | N5 | 10000 |
| N2 | 1 | N1 | 10000 |
| | 2 | N3 | 10000 |
| | 3 | N5 | 10000 |
| | 4 | N6 | 10000 |
| N3 | 1 | N2 | 10000 |
| | 2 | N3 | 10000 |
| N4 | 1 | N1 | 10000 |
| | 2 | N5 | 10000 |
| N5 | 1 | N1 | 10000 |
| | 2 | N2 | 10000 |
| | 3 | N4 | 10000 |
| | 4 | N6 | 10000 |
| N6 | 1 | N2 | 10000 |
| | 2 | N5 | 10000 |

FIG. 17

CASE OF TREE 1

| NODE ID | PARENT NODE | COST UP TO ROOT NODE |
|---|---|---|
| N1 | — | 0 |
| N2 | N1 | 1 |
| N3 | N2 | 2 |
| N4 | N1 | 1 |
| N5 | N1 | 1 |
| N6 | N2 | 2 |

FIG. 20

| NODE ID | BASE-POINT ACCOMMODATION NODE CANDIDATE | PORT ID | POINT-TO-POINT LINK NODE ID | BAND |
|---|---|---|---|---|
| N1 | N1 | 1 | N2 | 10000 |
|  |  | 2 | N4 | 10000 |
|  |  | 3 | N5 | 10000 |
| N2 | 0 | 1 | N1 | 10000 |
|  |  | 2 | N3 | 10000 |
|  |  | 3 | N5 | 10000 |
|  |  | 4 | N6 | 10000 |
| N3 | N1 | 1 | N2 | 10000 |
|  |  | 2 | N3 | 10000 |
| N4 | N1 | 1 | N1 | 10000 |
|  |  | 2 | N5 | 10000 |
| N5 | 0 | 1 | N1 | 10000 |
|  |  | 2 | N2 | 10000 |
|  |  | 3 | N4 | 10000 |
|  |  | 4 | N6 | 10000 |
| N6 | N1 | 1 | N2 | 10000 |
|  |  | 2 | N5 | 10000 |

FIG.21A

TREE 1

| NODE ID | PARENT NODE | COST UP TO ROOT NODE |
|---|---|---|
| N1 | -- | 0 |
| N2 | N1 | 1 |
| N3 | N2 | 2 |
| N4 | N1 | 1 |
| N5 | N1 | 1 |
| N6 | N2 | 2 |

FIG.21B

TREE 3

| NODE ID | PARENT NODE | COST UP TO ROOT NODE |
|---|---|---|
| N1 | N2 | 2 |
| N2 | N3 | 1 |
| N3 | -- | 0 |
| N4 | N1 | 3 |
| N5 | N2 | 2 |
| N6 | N3 | 1 |

FIG.21C

TREE 4

| NODE ID | PARENT NODE | COST UP TO ROOT NODE |
|---|---|---|
| N1 | N4 | 1 |
| N2 | N1 | 2 |
| N3 | N2 | 3 |
| N4 | -- | 0 |
| N5 | N4 | 1 |
| N6 | N5 | 2 |

FIG.21D

TREE 6

| NODE ID | PARENT NODE | COST UP TO ROOT NODE |
|---|---|---|
| N1 | N2 | 2 |
| N2 | N6 | 1 |
| N3 | N6 | 1 |
| N4 | N5 | 2 |
| N5 | N6 | 1 |
| N6 | -- | 0 |

FIG. 23

| NODE ID | PORT ID | POINT-TO-POINT LINK NODE ID | LINK BAND |
|---|---|---|---|
| N1 | 1 | N2 | 10000 |
| | 2 | N4 | 10000 |
| N2 | 1 | N1 | 10000 |
| | 2 | N3 | 10000 |
| | 3 | N5 | 10000 |
| N3 | 1 | N2 | 10000 |
| | 2 | N6 | 10000 |
| N4 | 1 | N1 | 10000 |
| N5 | 1 | N2 | 10000 |
| | 2 | N7 | 10000 |
| N6 | 1 | N3 | 10000 |
| N7 | 1 | N5 | 10000 |

FIG. 24

| NODE ID | PORT ID | POINT-TO-POINT LINK NODE ID | LINK BAND |
|---|---|---|---|
| N1 | 1 | N2 | 10000 |
| | 2 | N4 | 10000 |
| N2 | 1 | N1 | 10000 |
| | 2 | N3 | 10000 |
| N3 | 1 | N2 | 10000 |
| | 2 | N6 | 10000 |
| N4 | 1 | N1 | 10000 |
| N6 | 1 | N3 | 10000 |

FIG. 26

| NODE ID | BELONGING SUB-DOMAIN | PORT ID | POINT-TO-POINT LINK NODE ID | LINK BAND |
|---|---|---|---|---|
| N1 | 1 | 1 | N2 | 10000 |
|    |   | 2 | N4 | 10000 |
| N2 | 2 | 1 | N1 | 10000 |
|    |   | 2 | N3 | 10000 |
|    |   | 3 | N5 | 10000 |
| N3 | 3 | 1 | N2 | 10000 |
|    |   | 2 | N6 | 10000 |
| N4 | 1 | 1 | N1 | 10000 |
| N5 | 4 | 1 | N2 | 10000 |
|    |   | 2 | N7 | 10000 |
|    |   | 3 | N8 | 10000 |
| N6 | 3 | 1 | N3 | 10000 |
| N7 | 4 | 1 | N5 | 10000 |
|    |   | 2 | N8 | 10000 |
| N8 | 4 | 1 | N5 | 10000 |
|    |   | 2 | N7 | 10000 |

FIG. 27

| SUB-DOMAIN ID | BASE-POINT ACCOMMODATION CANDIDATE |
|---|---|
| N1 | 1 |
| N2 | 0 |
| N3 | 1 |
| N4 | 1 |

FIG. 28

| NODE ID | BELONGING SUB-DOMAIN | PORT ID | POINT-TO-POINT LINK NODE ID | LINK BAND |
|---|---|---|---|---|
| N1 | 1 | 1 | N2 | 10000 |
| | | 2 | N4 | 10000 |
| N2 | 2 | 1 | N1 | 10000 |
| | | 2 | N3 | 10000 |
| N3 | 3 | 1 | N2 | 10000 |
| | | 2 | N6 | 10000 |
| N4 | 1 | 1 | N1 | 10000 |
| N6 | 3 | 1 | N3 | 10000 |

FIG. 29C
| NODE ID | PARENT NODE | COST UP TO ROOT NODE | SURROGATE PARENT NODE |
|---------|-------------|----------------------|-----------------------|
| N1 | — | 0 | 0 |
| N2 | N1 | 1 | 0 |
| N3 | N2 | 2 | 0 |
| N4 | N1 | 1 | 0 |
| N5 | N1 | 1 | 0 |
| N6 | N2 | 2 | N5 |
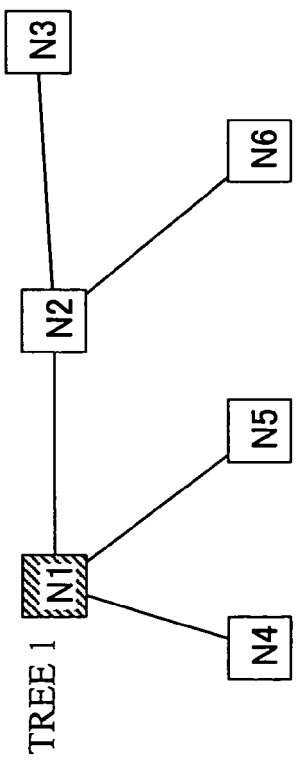
FIG. 29A
TREE 1
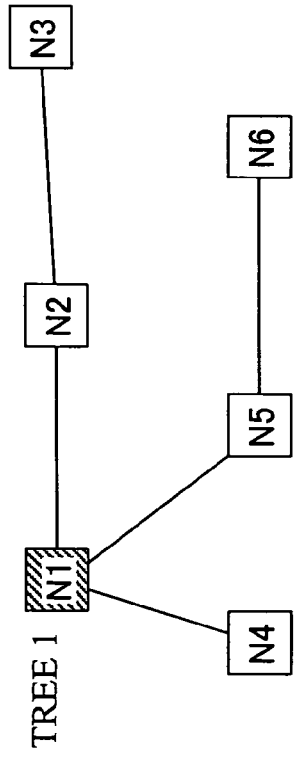
FIG. 29B
TREE 1

FIG. 30A

TREE 1

| NODE ID | PARENT NODE | COST UP TO ROOT NODE | SURROGATE PARENT NODE |
|---|---|---|---|
| N1 | -- | 0 | 0 |
| N2 | N1 | 1 | 0 |
| N3 | N2 | 2 | 0 |
| N4 | N1 | 1 | 0 |
| N5 | N1 | 1 | 0 |
| N6 | N2 | 2 | N5 |

FIG. 30B

TREE 3

| NODE ID | PARENT NODE | COST UP TO ROOT NODE | SURROGATE PARENT NODE |
|---|---|---|---|
| N1 | N2 | 2 | 0 |
| N2 | N3 | 1 | 0 |
| N3 | -- | 0 | 0 |
| N4 | N1 | 3 | N5 |
| N5 | N2 | 2 | N6 |
| N6 | N3 | 1 | 0 |

FIG. 30C

TREE 4

| NODE ID | PARENT NODE | COST UP TO ROOT NODE | SURROGATE PARENT NODE |
|---|---|---|---|
| N1 | N4 | 1 | 0 |
| N2 | N1 | 2 | N5 |
| N3 | N2 | 3 | N6 |
| N4 | -- | 0 | 0 |
| N5 | N4 | 1 | 0 |
| N6 | N5 | 2 | 0 |

FIG. 30D

TREE 6

| NODE ID | PARENT NODE | COST UP TO ROOT NODE | SURROGATE PARENT NODE |
|---|---|---|---|
| N1 | N2 | 2 | N5 |
| N2 | N6 | 1 | 0 |
| N3 | N6 | 2 | 0 |
| N4 | N5 | 1 | 0 |
| N5 | N6 | 1 | 0 |
| N6 | -- | 0 | 0 |

FIG. 31

| NODE ID | PORT ID | POINT-TO-POINT LINK NODE ID | BAND |
|---|---|---|---|
| N1 | 1 | N2 | 10000 |
| | 2 | N4 | 10000 |
| | 3 | N5 | 10000 |
| N2 | 1 | N1 | 10000 |
| | 2 | N3 | 10000 |
| | 3 | N5 | 10000 |
| | 4 | N6 | 5 |
| N3 | 1 | N2 | 10000 |
| | 2 | N3 | 10000 |
| N4 | 1 | N1 | 10000 |
| | 2 | N5 | 10000 |
| N5 | 1 | N1 | 10000 |
| | 2 | N2 | 10000 |
| | 3 | N4 | 10000 |
| | 4 | N6 | 5 |
| N6 | 1 | N2 | 5 |
| | 2 | N5 | 10000 |

FIG. 33

| VLAN ID | NODE ID | TRANSFERABLE PORT ID | ALLOCATION OUTPUT RATE |
|---|---|---|---|
| A | N1 | 1 | 20 |
|   |    | 2 | 30 |
|   | N2 | 1 | 20 |
|   |    | 2 | 10 |
|   |    | 3 | 10 |
|   | N3 | 1 | 30 |
|   | N4 | 1 | 10 |
|   | N6 | 1 | 10 |

FIG. 34

| VLAN ID | NODE ID | TRANSFERABLE PORT ID | ALLOCATION OUTPUT RATE |
|---|---|---|---|
| A | N1 | 1 | 10 |
| | | 2 | 30 |
| | | 3 | 10 |
| | N2 | 1 | 10 |
| | | 2 | 10 |
| | N3 | 1 | 10 |
| | N4 | 1 | 30 |
| | N5 | 3 | 10 |
| | | 3 | 10 |
| | N6 | 3 | 10 |

FIG. 35

| NODE ID | PORT ID | POINT-TO-POINT LINK NODE ID | LINK BAND |
|---|---|---|---|
| N1 | 1 | N2 | 10000 |
| | 2 | N4 | 10000 |
| | 3 | N5 | 10000 |
| N2 | 1 | N1 | 10000 |
| | 2 | N3 | 10000 |
| | 3 | N5 | 10000 |
| | 4 | N6 | 10 |
| N3 | 1 | N2 | 10000 |
| | 2 | N3 | 10000 |
| N4 | 1 | N1 | 10000 |
| | 2 | N5 | 10000 |
| N5 | 1 | N1 | 10000 |
| | 2 | N2 | 10000 |
| | 3 | N4 | 10000 |
| | 4 | N6 | 10000 |
| N6 | 1 | N2 | 10 |
| | 2 | N5 | 10000 |

FIG. 36

| NODE ID | PORT ID | POINT-TO-POINT LINK NODE ID | LINK BAND |
|---|---|---|---|
| N1 | 1 | N2 | 9980 |
| | 2 | N4 | 9970 |
| | 3 | N5 | 10000 |
| N2 | 1 | N1 | 9980 |
| | 2 | N3 | 9990 |
| | 3 | N5 | 10000 |
| | 4 | N6 | 0 |
| N3 | 1 | N2 | 9990 |
| | 2 | N3 | 10000 |
| N4 | 1 | N1 | 9970 |
| | 2 | N5 | 10000 |
| N5 | 1 | N1 | 10000 |
| | 2 | N2 | 10000 |
| | 3 | N4 | 10000 |
| | 4 | N6 | 10000 |
| N6 | 1 | N2 | 0 |
| | 2 | N5 | 10000 |

FIG.37A
USER 1

| BASE-POINT NODE ID | BASE-POINT ACCOMMODATION NODE ID | SUBSCRIPTION BAND |
|---|---|---|
| 101 | N1 | 40 |
| 102 | N3 | 10 |
| 103 | N4 | 30 |
| 104 | N6 | 10 |

FIG.37B
USER 2

| BASE-POINT NODE ID | BASE-POINT ACCOMMODATION NODE ID | SUBSCRIPTION BAND |
|---|---|---|
| 101 | N1 | 40 |
| 102 | N3 | 10 |
| 103 | N4 | 30 |
| 104 | N6 | 10 |

FIG. 38A

RESULT OF DESIGN FOR USER 1

| VLAN ID | NODE ID | TRANSFERABLE PORT ID | ALLOCATION OUTPUT RATE |
|---|---|---|---|
| A | N1 | 1 | 20 |
|   |    | 2 | 30 |
|   | N2 | 1 | 20 |
|   |    | 2 | 10 |
|   |    | 3 | 30 |
|   | N3 | 1 | 10 |
|   | N4 | 1 | 10 |
|   | N6 | 1 | 10 |

FIG. 38B

RESULT OF DESIGN FOR USER 2

| VLAN ID | NODE ID | TRANSFERABLE PORT ID | ALLOCATION OUTPUT RATE |
|---|---|---|---|
| B | N1 | 1 | 20 |
|   |    | 2 | 30 |
|   | N2 | 1 | 20 |
|   |    | 2 | 10 |
|   |    | 3 | 30 |
|   | N3 | 1 | 10 |
|   | N4 | 1 | 10 |
|   | N6 | 1 | 10 |

FIG. 38C

INFORMATION ABOUT THE TREE 1 FOR USER 1

| NODE ID | PARENT NODE | COST UP TO ROOT NODE | SURROGATE PARENT NODE |
|---|---|---|---|
| N1 | — | 0 | 0 |
| N2 | N1 | 1 | 0 |
| N3 | N2 | 2 | 0 |
| N4 | N1 | 1 | 0 |
| N5 | N1 | 1 | 0 |
| N6 | N2 | 2 | N5 |

FIG. 38D

INFORMATION ABOUT THE TREE 1 FOR USER 2

| NODE ID | PARENT NODE | COST UP TO ROOT NODE | SURROGATE PARENT NODE |
|---|---|---|---|
| N1 | — | 0 | 0 |
| N2 | N1 | 1 | 0 |
| N3 | N2 | 2 | 0 |
| N4 | N1 | 1 | 0 |
| N5 | N1 | 1 | 0 |
| N6 | N2 | 2 | N5 |

FIG. 39

| VLAN ID | NODE ID | TRANSFERABLE PORT ID | ALLOCATION OUTPUT RATE |
|---|---|---|---|
| A | N1 | 1 | 10 |
| | | 2 | 30 |
| | | 3 | 10 |
| | N2 | 1 | 10 |
| | | 2 | 10 |
| | N3 | 1 | 10 |
| | N4 | 1 | 30 |
| | N5 | 1 | 10 |
| | | 3 | 10 |
| | N6 | 3 | 10 |

FIG. 40

| NODE ID | PORT ID | POINT-TO-POINT LINK NODE ID | LINK BAND |
|---|---|---|---|
| N1 | 1 | N2 | 9990 |
| | 2 | N4 | 9970 |
| | 3 | N5 | 9990 |
| N2 | 1 | N1 | 9990 |
| | 2 | N3 | 9990 |
| | 3 | N5 | 10000 |
| | 4 | N6 | 10 |
| N3 | 1 | N2 | 9990 |
| | 2 | N3 | 10000 |
| N4 | 1 | N1 | 9970 |
| | 2 | N5 | 10000 |
| N5 | 1 | N1 | 9990 |
| | 2 | N2 | 10000 |
| | 3 | N4 | 10000 |
| | 4 | N6 | 9990 |
| N6 | 1 | N2 | 10 |
| | 2 | N5 | 9990 |

ROUTE DESIGNING METHOD

BACKGROUND OF THE INVENTION

The invention relates to a technology enabling a network to be utilized at a high efficiency by properly designing a route along which nodes relay traffic and also a traffic allocation in the network configured by connecting a plurality of nodes.

The invention is a technology employed for managing and operating, for instance, a virtual LAN service (Example: wide area Ethernet (registered trademark)) for providing multi-point-to-multipoint communications among user sites extending over a plurality of points. To be specific, the invention relates to a technology of determining a route for accommodating user traffic and bandwidth on a user-by-user basis to attain highly-efficiency accommodation while ensuring a sufficient speed to such an extent as not to exceed a subscribed bandwidth of a connection line (access link) between the user site and a relay network in a virtual LAN operation system.

As a service for providing the multipoint-to-multipoint communications between the plurality of user sites, there have hitherto been broadly known a so-called wide area Ethernet service and TLS (transparent LAN service), wherein Ether switch nodes are disposed in the relay network, and the user traffic is accommodated by use of an Ethernet VLAN technology. Hereinafter, the discussion will be made by exemplifying the wide area Ethernet.

In the wide area Ethernet accommodating multipoint LANs, a common carrier for providing services determines routes (tree topology) that connect all the user sites to be connected each other, and allocates the routes as a logical broadcast domain (VLANs) to the users. At this time, a transferable VLAN and an untransferable VLAN are set per output port in the Ether switch nodes. This enables determination of a reachable range of the user traffic, whereby a traffic sent from a site of a user A can be prevented from reaching a site of a different user B by allocating a different VLAN to every user. Namely, the same network is capable of accommodating a plurality of different user traffics.

Herein, an aggregation of the nodes or links included in the logical broadcast domain allocated to a certain user is referred to as a route, and a process of determining a range of the logical broadcast domain is called a route design. This route design involves, specifically, determining which port the traffic is made transferable at and which port the traffic is made untransferable at in each of the nodes on the relay network, and determining bandwidth to be allocated to each of these ports.

The VLAN allocation to the user traffic is actualized by attaching, for example, a VLAN tag defined in IEEE802.1Q to each Ethernet frame sent by the user at an ingress node of the relay network. The tag contains an identifier (VLANID) for identifying the traffic.

Supposing that the VLANID for the user A is determined to be, e.g., No. 100 (a process of determining what number of VLANID is assigned and which user is assigned the VLANID, is done by, for example, an operator who properly determines a unique value that is not overlapped with those of other users), VLANID 100 is written into the VLAN tag of the Ethernet frame of the user A. In an interior of the relay network (including the ingress node of the relay network), a traffic transferable port is determined by seeing this VLANID. It is based on the normal Ethernet technology to determine specifically which port among the transferable ports the traffic is transferred to. Namely, this depends on a destination MAC address contained in each Ethernet frame and on a function of the node (which will hereinafter be also called an Ethernet device).

If the Ethernet device has a MAC address learning function and if a MAC address learning table has an entry of a destination MAC address and a transfer destination port, the frame is forwarded to this port. In the case of the Ethernet frame containing a destination MAC address that is not entered in the MAC address learning table or the Ethernet device that does not have the MAC address learning function, the received frame is copied and thus forwarded (broadcast) to all the transferable ports excluding the receipt port. When the frame is forwarded across the relay network and reaches an egress node of the relay network, the egress node detaches the VLAN tag from the frame and outputs the frame to a port corresponding to this VLANID, thereby completing the traffic transfer to the desired user.

In the wide area Ethernet, it is a main case at the present that the user settles (subscribes) a speed (bandwidth) of an access link for every want-to-connect site with the service provider and is provided (receives) the service. The access link indicates a circuit that connects the site to the relay network. In this case, the user traffic, after being narrowed down to a traffic speed that does not exceed the subscription value in the access link of the site, flows into the relay network. Within the relay network, the traffic is forwarded based on the Ethernet system (the broadcast, the MAC address learning, etc.) within the logical broadcast domain allocated to the user.

It is considered that the user traffic, of which the traffic speed has been narrowed down in the access link, is therefore flowed without being controlled particularly in its bandwidth along the route determined (e.g., manually) by the operator (the service provider) or in a way of its being allocated with bandwidth large enough to accommodate the user traffic (for example, to such an extent as not to cause a conflict in communications performed among all the sites) in the respective links on the route in the relay network. In the latter case, there is allocated simply large bandwidth, e.g., 100 Mbps larger than a sum 90 Mbps of the access link bands of all the sites along the route (FIG. 1), and so on.

Prior arts related to the invention of the present application are technologies disclosed in, for example, the following patent documents 1 through 4.

[Patent Document 1]
Japanese Patent Application Laid-Open Publication No. 9-83546
[Patent Document 2]
Japanese Patent Application Laid-Open Publication No. 11-341154
[Patent Document 3]
Japanese Patent Application Laid-Open Publication No. 2002-141932

SUMMARY OF THE INVENTION

Therefore, in the case of performing the communications between the two sites each subscribing different bandwidth, traffic equal to or larger than the access link subscription bandwidth on the receiving side is sent from a transmitting side, and it might happen that an excessive quantity of traffic is to be discarded just anterior to the access link on the receiving side. As viewed from the relay network, this means that the futile traffic to be discarded has been forwarded, which is a waste of bandwidth.

The waste of bandwidth might cause a decline of a quality of service to other users. Further, it is desirable for increasing the number of users accommodated in the network that a total sum of the bandwidths utilized by the users (which is called a consumable bandwidth) be small as much as possible, and the waste of bandwidth hinders this.

A scheme for avoiding this is that utilizable bandwidth for every user may be set and controlled in each of the links on the relay network. However, there is multiplicity of accommodation sites, and a traffic request from the site is assumed such that a maximum speed of the traffic from the site is given simply as subscription bandwidth of the access link and it is not determined which site receives the traffic request and how many traffic requests are given thereto. There is not any method of effectively determining the utilizable bandwidth.

A premise herein is that the route be given. Whatever routes, if each of these routes connects all the sites and is not of a loop type, are available. For example, the route may also be a route determined by an operator who selects links from a management screen, etc. as by mouse clicking or the like.

It is an object of the invention to provide a technology capable of easily conducting the route design for efficiently accommodating the user traffic.

The invention adopts the following means in order to solve the problems.

(1) A route designing method according to the invention is a method of designing a communication route between user sites in a network management device connecting to a relay node in a network that connects a plurality of user sites to each other through a plurality of relay nodes and links, the method comprising a step of accepting an input of user information containing information about bandwidth of an access link serving as a link for connecting each of the user sites to the relay node, and information showing the relay node connecting to the user site via the access link, a step of acquiring topology information of the network for relaying the communications between the user sites, wherein each of the user sites is a point through which traffic of a user flow into/out of a network, a step of obtaining a communication relay port and a communication non-relay port on the basis of the user information and the topology information, obtaining an upper limit of communication bandwidth of the communication relay port, and performing a route design so that the user sites are connected by a tree-shaped route, and a step of outputting a result of the route design.

With this scheme, the route for efficiently accommodating the user traffic and the allocation bandwidth are determined, and besides the result thereof can be automatically set in the network device, whereby a labor and time needed for the operation can be restrained.

(2) A route designing method according to the invention is a route designing method according to Note 1, wherein the step of performing the route design involves setting the upper limit of the communication bandwidth allocated to a user on an arbitrary port with respect to each of the relay node on the route that connects all the user sites, so as to be equal to or smaller than a sum of upper limits of communication bandwidth allocated to the user on the other ports which belong to the node.

With this scheme, the user traffic is, whenever forwarded by the node within the relay network, narrowed down by discarding an excessive quantity of traffic over an allowable quantity of a section from this node up to the site on the receiving side. Namely, it is possible to allocate the utilizable bandwidth of the respective relay nodes so as to discard at an early stage the should-be-discarded traffic exceeding the communication bandwidth of the access link on the receiving side, and a traffic discarding point can be made as close to the traffic transmission side as possible. Hence, it is feasible to design the route capable of restraining the futile traffic transfer on the relay network.

(3) In a route designing method according to the invention, the step of performing the route design involves obtaining a tree-shaped route with each relay node serving as a root, defining a condition indicating the communication non-relay node, and obtaining a communication route by excluding the relay nodes applicable to the condition from the relay nodes configuring the tree-shaped route.

Owing to this scheme, it is possible to save a process unrelated to the relay of the communications between the user sites and to design the route at a small cost for calculation.

(4) The step of performing the route design involves obtaining a tree-shaped route of which a root is a site accommodation node as the relay node connecting to the user site via the access link, obtaining evaluation values acquired from bandwidth utilizable on the access link connecting each user site to the relay nodes and from the number of relay nodes needed for reaching from each user site with respect to all the relay nodes configuring the tree-shaped route, and obtaining a shortest hop-by-hop route built up by connecting the relay nodes selected based on the evaluation values to each site with a minimum hop count.

This scheme enables the route to be designed in a comparatively short time when (Site Accommodation Node Count)< (Total Relay Node Count).

(5) The step of performing the route design involves obtaining a tree-shaped route with each relay node serving as a root, defining a condition indicating the communication non-relay node, excluding the relay nodes applicable to the condition from the relay nodes configuring the tree-shaped route, and allocating bandwidth so as to minimize a total sum of the bandwidth allocated to the respective links with respect to the tree-shaped route after the exclusion thereof.

This scheme makes it possible to determine in a comparatively short time the route and the allocation bandwidth to minimize the consumable bandwidth.

(6) The step of performing the route design involves obtaining a tree-shaped route of which a root is a site accommodation node as the relay node connecting to the user site via the access link, obtaining evaluation values acquired from bandwidth utilizable on the access link connecting each user site to the relay nodes and from the number of relay nodes needed for reaching from each user site with respect to all the relay nodes configuring the tree-shaped route, obtaining a shortest hop-by-hop route built up by connecting the relay nodes selected based on the evaluation values to each site with a minimum hop count, and allocating communication bandwidth for the shortest hop-by-hop route.

With this scheme, when (Site Accommodation Node Count)<(Relay Node Count), the shortest hop-by-hop route is specified in a comparatively short time, and the bandwidth allocation may be effected with respect to only this specified route, whereby the proper route and bandwidth can be determined in the comparatively short time.

(7) In the route designing method according to the invention, information about the tree-shaped route of which a root is the relay node capable of becoming the site accommodation node is previously acquired and stored, and is read out and thus utilized when conducting a route design.

This scheme eliminates a necessity of performing the same shortest route tree calculation many times, and hence the calculation time for the individual user can be restrained.

(8) In the route designing method according to the invention, the route design is carried out after excluding, from a design object, the relay nodes that have a port count "1" and are not the user site accommodation nodes and all the links connected thereto.

This scheme enables the nodes and the links as the design object to be reduced, and therefore the time required for the shortest route tree calculation is decreased, which leads to a reduction in the design time.

(9) In the route designing method according to the invention, if the network is managed in a way that divides the network into sub-domains, the route design is carried out after excluding, from the design object, nodes belonging to the sub-domains including none of the relay nodes connecting to the user sites via the access link and also all the links connected thereto.

This scheme enables the nodes and the links as the design object to be reduced, and therefore the time required for the shortest route tree calculation is decreased, which leads to the reduction in the design time.

(10) In the route designing method according to the invention, if a different route reachable to the root node with the same relay count from an unspecified relay node is acquired on the occasion of obtaining the tree-shaped route, information about this different route is retained as information belonging to this node.

In the case of changing the route acquired by the route design, a route (surrogate route) capable of bypassing with the same hop count can be promptly presented without performing again the calculation.

(11) In the route designing method according to the invention, after completing the route design, a result of the route design and the information about the different route are retained.

After completing the route design, in the case of changing the route acquired by the route design, a route (surrogate route) capable of bypassing with the same hop count can be promptly presented without performing again the calculation.

Further, the invention may be a route designing program for making the network management device execute the processes in (1) through (11) given above. Moreover, the invention may also be a storage medium so stored with the program as to be readable by the device (the network management device, a computer) for executing the program. Then, each device reads and executes the program on the storage medium, whereby a function thereof can be provided.

The storage medium readable by the device includes storage mediums capable of storing information such as data, programs, etc. electrically, magnetically, optically and mechanically or by chemical action, which can be read by the device such as the computer, etc. What is demountable out of the device among those storage mediums may be, e.g., a flexible disk, a magneto-optic disk, a CD-ROM, a CD-R/W, a DVD, a DAT, an 8 mm tape, a memory card, etc.

Further, a hard disk, a ROM (Read Only Memory) and so on are storage mediums fixed within the computer.

Further, according to the invention, in a network system comprising a network for connecting a plurality of user sites to each other through a plurality of relay nodes and links, and a network management device connecting to the relay node, the network management device includes an input unit for accepting an input of user information containing information about bandwidth of an access link serving as a link for connecting each of the user sites to the relay node, and information showing the relay node connecting to the user site via the access link, a topology acquiring unit for acquiring topology information of the network for relaying the communications between the user sites, wherein each of the user sites is a point through which traffic of a user flow into/out of a network, a route designing unit for obtaining a communication relay port and a communication non-relay port on the basis of the user information and the topology information, obtaining an upper limit of communication bandwidth available for the user on the communication relay port, and performing a route design so that the user sites are connected by a tree-shaped route, and a route output unit for outputting a result of the route design, and the relay node includes an input unit for accepting traffic of the communication, an output unit for outputting the traffic to a next node via the port, a setting acquisition unit for receiving setting information from the network management device, and a setting unit for setting a port of the output unit on the basis of the setting information.

According to the invention, it is possible to provide the technology capable of easily performing the route design for efficiently accommodating the user traffic.

DESCRIPTION OF THE DRAWINGS

FIG. 4 is a diagram showing an example of topology information retained on a network management device.

FIG. 5 is a diagram showing an example of accommodation target user information.

FIG. 7 is a diagram showing a result of the design for the user information in FIG. 5.

FIG. 9A-9D are an explanatory diagram of an algorithm when allocating bandwidth.

FIG. 11 is a diagram showing an example of user information.

FIG. 14 is a diagram showing topology information in FIG. 13.

FIG. 17 is a diagram showing an example of Dijkstra algorithm.

FIG. 20 is a diagram showing an example of the topology information to which candidates for base-point accommodation nodes are added.

FIG. 21A-21D are a diagram showing an example of a tree table.

FIG. 23 is a diagram showing an example of the topology information.

FIG. 24 is a diagram showing an example of the topology information after excluding the nodes.

FIG. 26 is a diagram showing an example of the topology information containing sub-domain attributes.

FIG. 27 is a diagram showing an example of a sub-domain information table.

FIG. 28 is a diagram showing an example of the topology information after excluding the nodes.

FIG. 29A-29C are a diagram showing an example of an equal-cost different route.

FIG. 30A-30D are a diagram showing a result of processing by the Dijkstra algorithm created when obtaining the evaluation values on the trees.

FIG. 31 is a diagram showing an example of the topology information in FIG. 13.

FIG. 33 is a diagram showing a result of the design in FIG. 19.

FIG. 34 is a diagram showing a result of the design in FIG. 32.

FIG. 35 is a diagram showing an example of the topology information in FIG. 13.

FIG. 36 is a diagram showing the topology information after accommodating a traffic of a user 1.

FIG. 37A-37B are a diagram showing an example of user information.

FIG. 38A-38D are a diagram showing a result of the design before bypassing.

FIG. 39 is a diagram showing a result of the design after bypassing.

FIG. 40 is a diagram showing the topology information after a changeover of the accommodation of the user 1.

DETAILED DESCRIPTION OF THE INVENTION

A best mode of carrying out the invention will hereinafter be described with reference to the drawings. Configurations in the following embodiments are exemplifications, and the invention is not limited to the configurations in the embodiments.

Embodiment 1

Figure 1:
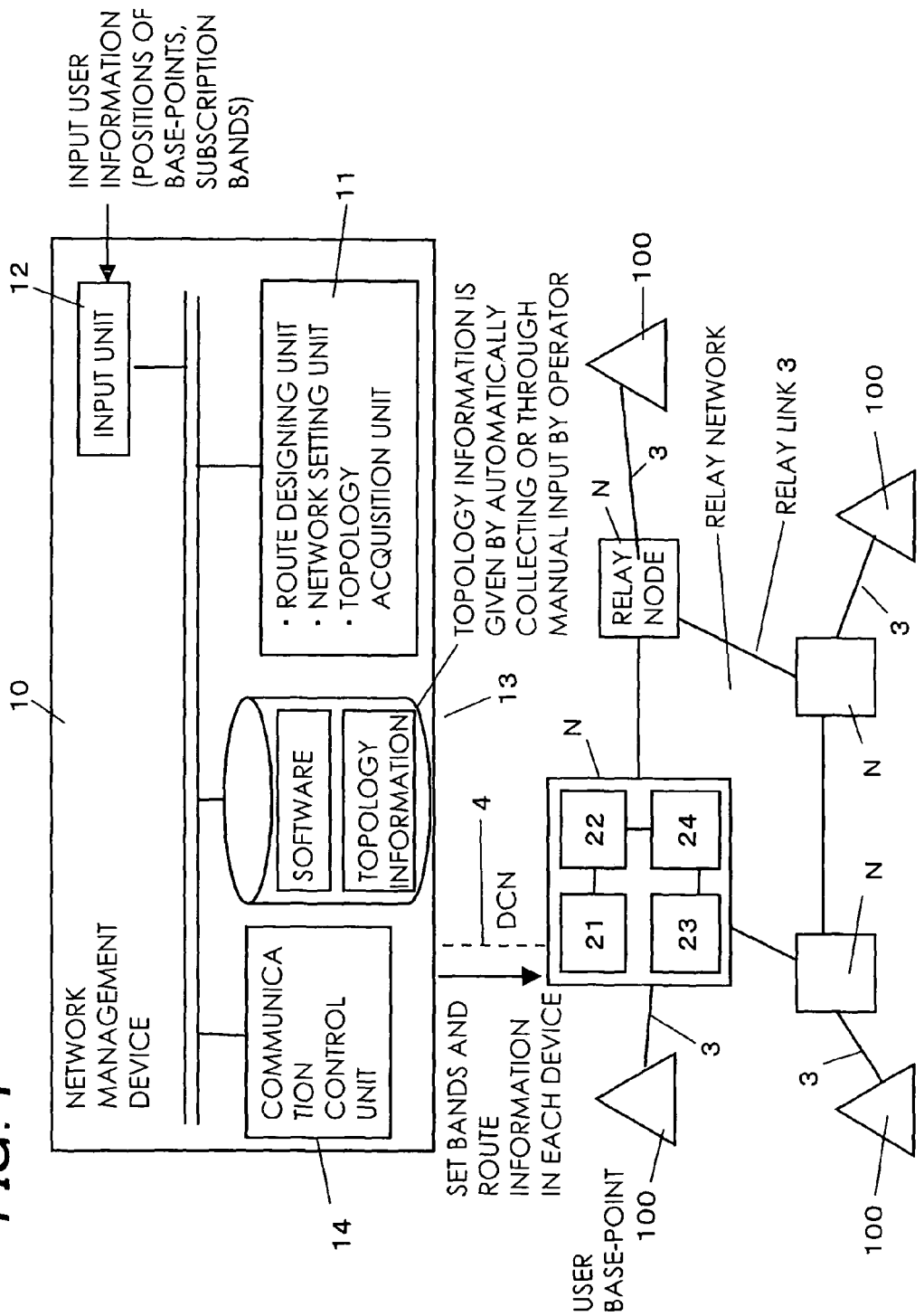
FIG. 1 is a view showing a whole architecture of a network system in an embodiment 1 of the invention.

FIG. 1 is a view showing a whole architecture of a network system by way of an embodiment 1 of the invention.

As shown in FIG. 1, the network system in the embodiment 1 includes a network management device 10 having a route designing function, relay nodes (network devices) N for relaying a user traffic, and a network that connects these devices to each other. The respective relay nodes N are connected via links 3, thus configuring a relay network. A network 4 for setting may be, for example, Ethernet. The setting network 4 may connect the network management device 10 to each of all the relay nodes and may also connect the network management device 10 to only a single unspecified relay node N, wherein this relay node N may send a setting command (setting information) to other relay nodes N via a relay network for transferring (forwarding) the user traffic.

The relay node N includes an input unit 21 for accepting an input of the traffic of communications (the user traffic) between sites of the users, an output unit 22 for outputting the user traffic to a next node (the relay node or the site of the user) via a port that will be explained later on, a setting acquisition unit 23 for receiving the setting information from the network management device 10, and a setting unit 24 for conducting the setting of ports of the output unit on the basis of the setting information.

The relay node N handles the entire traffic flowing between user sites 100 as one group, and outputs the group traffic from a port set per group in a plurality of ports possessed by the output unit 22. With this scheme, each of the relay nodes N relays the traffic along a route designed by the network management device 10.

In the relay node N for actualizing the group-by-group relaying, the setting acquisition unit 23 receives the setting information via the setting network 4 from the network management device 10, and the setting unit 24 sets, based on this piece of setting information, which port is capable of transferring the traffic and which port is incapable of transferring on the group-by-group basis in the output unit 22. Further, the setting unit 24 sets an upper limit of a speed (output rate) of the traffic of that group with respect to the transferable port.

Figure 2:
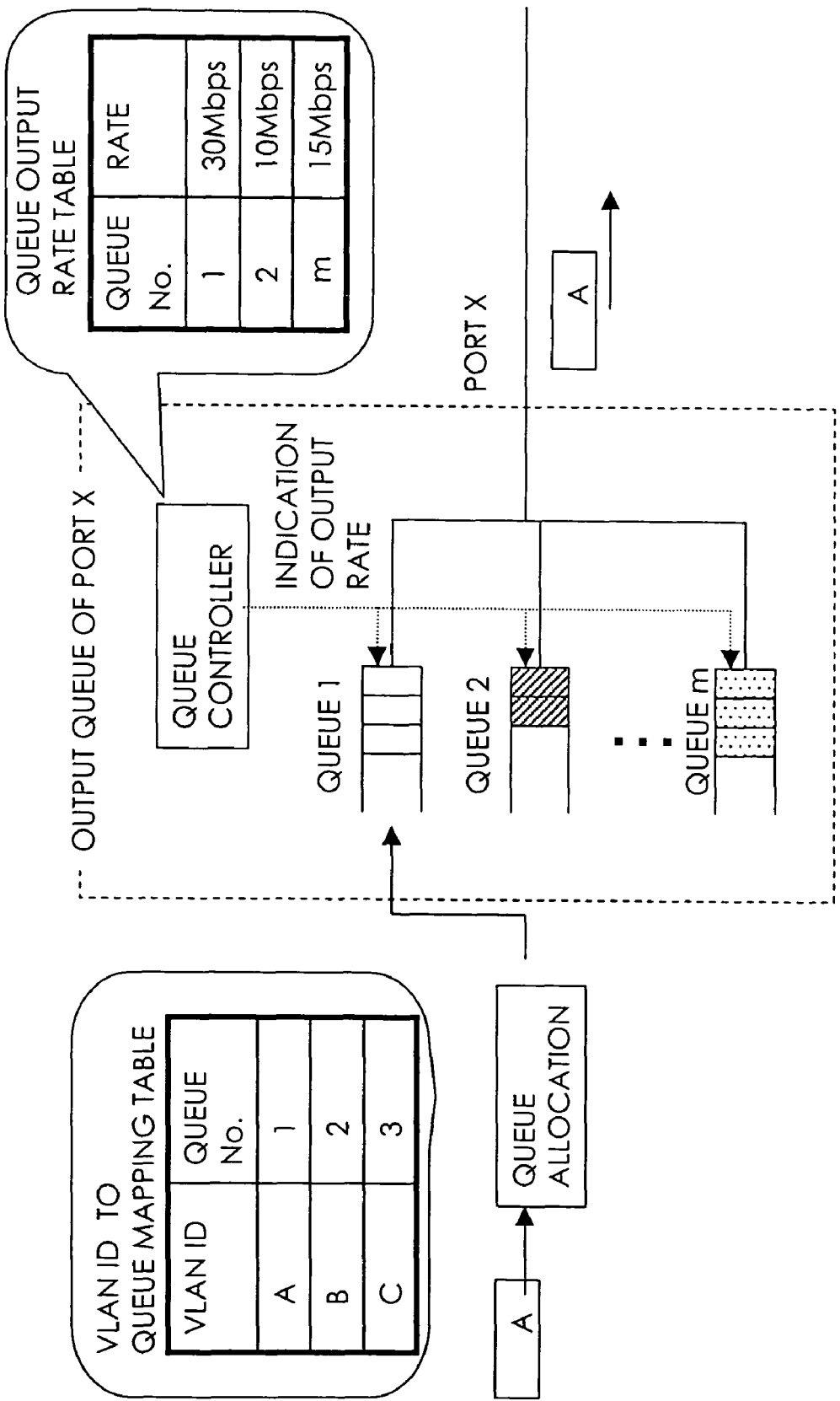
FIG. 2 is an explanatory view of control of a traffic transfer rate.

In the case of wide area Ethernet, the relay node N is classified as an Ethernet device, and the technology of dealing with the user traffic in a way that arranges the traffic into the group may involve the use of a VLAN technology defined by IEEE802.1Q. On condition that a device supports the VLAN technology, this device is capable of setting the transferable port and the untransferable port on the group-by-group basis (VLAN). Further, a process of setting the upper limit of the traffic transfer rate of the group (VLAN) on a port-by-port basis, is the same as the process executed by a known device (e.g., Ethernet device FlashWave5550 made by Fujitsu Corp.). FIG. 2 illustrates an image of traffic transfer rate control per VLAN in the relay node N. As shown in FIG. 2 the relay node N has a function of selectively outputting only the traffic (frame) of a predetermined group at each output port.

In the relay node N, the setting acquisition unit 23 previously accepts a control command (setting information) from the network management device 10 via a manual command line or the setting network 4, the setting unit 24 sets, based on this command, corresponding items in a VLANID-to-queue mapping table and in a queue transfer rate table for each port. Namely, the setting unit 24 updates the corresponding items in the VLANID-to-queue mapping table and in the queue transfer rate table, which are stored in a memory within the output unit 22. Then, the output unit 22 of the relay node N allocates the received frames to the queues mapped (corresponding) to VLANIDs by referring to this VLANID-to-queue mapping table, then determines which VLANID the corresponding frame has and which port this frame is transferred to, and outputs a queue having a predetermined queue No. at a rate (bandwidth) based on the queue transfer rate table. In the following discussion, setting targets are only the transferable port corresponding to the VLANID and the output rate assigned to this VLANID, and there is, for simplicity, omission of specific items showing concretely what number of queue the VLANID to be set corresponds to, what number of entry in the queue transfer rate table a rate of ○○ bps is written in, and so forth. Note that the process by this output unit 22 may be whatever known-process if capable of outputting the traffic of each group at a predetermined bandwidth from a predetermined port on the basis of the setting without being limited to those described above.

The network management device 10 is a general type of computer constructed of an arithmetic processing unit 11 composed of a CPU and a main memory, an input unit 12, a storage unit (hard disk) 13, a communication control unit (CCU) 14, etc.

The storage unit 13 is stored with a software suite such as programs for managing and operating the network and performing the route design, an operating system and so on. Further, the storage unit 13 has a built-up topology information database stored with pieces of topology information of the relay networks, which are automatically collected or manually inputted by an operator.

The input unit 12 accepts user site information from the operator in order to make a user accommodation network design. This information acceptance may be done in the form of some-formatted files or by an operation through a GUI (Graphical User Interface) or by a text input and a command input.

The communication control unit 14 connects to each of the relay nodes N via the setting network 4, and controls communications for transmitting the setting information and for acquiring the topology information.

The arithmetic processing unit 11 processes the information from the input unit 12 and from the CUU 14 in accordance with the program stored on the storage unit 13, thereby functioning also as a route designing unit, a network setting unit (corresponding to a route output unit) and a topology acquisition unit.

The topology acquisition unit acquires topology information of the relay network from the topology information database in the storage unit 13. The topology information in the topology information database may be, as in a generally well-known network management system, automatically collected and retained, and may also be manually inputted by the operator each time a design is made. The topology information contains pieces of information (such as IDs, etc.) of the relay nodes N and pieces of port information (port numbers, and IDs of the point-to-point link relay nodes N linked to the ports, and pieces of information (such as bandwidth, allocated bandwidth) of a link 3 configured by linking the ports, and so on) held by the nodes on the relay network.

The route designing unit designs a tree-shaped route that connects the user sites accepted by the input unit in a way that refers to the topology information database, The network setting unit transmits the setting information to the relay nodes and makes each of the relay node set a relay route and its bandwidth on the basis of a result of the design made by the route designing unit.

Figure 3:
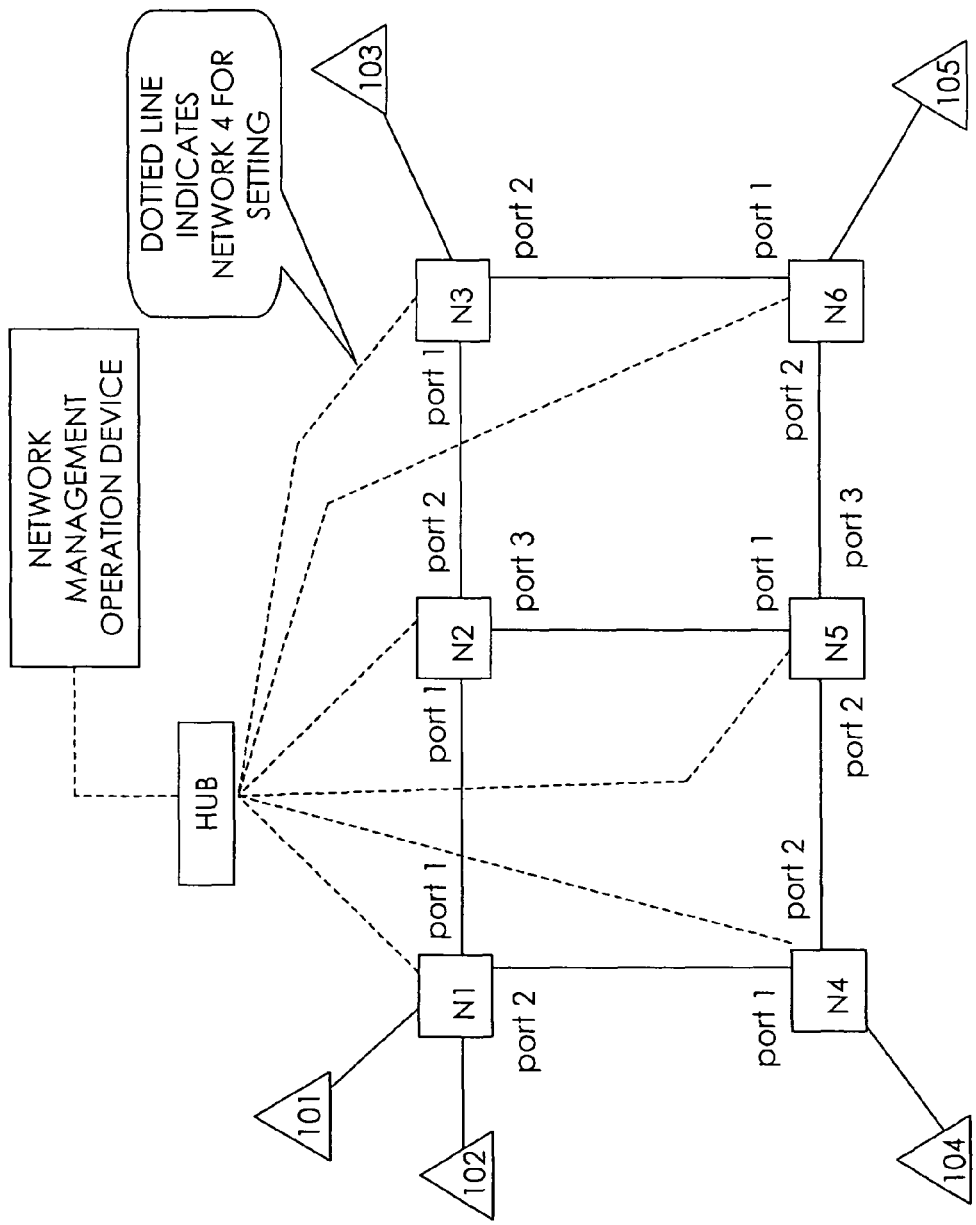
FIG. 3 is an explanatory view of a route design in a network system in an embodiment 1.

FIG. 3 is an explanatory diagram of the route design in the network system in the embodiment 1. In FIG. 3, squared objects designated by N1 through N6 represent the relay nodes N, a solid line that links these nodes N represents the link 3, port ○○ indicates a port number held by the device, a dotted line shows the setting network 4, and triangles 101 through 105 represent the user sites (that are specifically edge routers, etc. at the respective sites) 2. In this case, the relay network indicates a network configured by the relay nodes N1 through N6 and the link (access link) 3 that connects the relay nodes N1 through N6 and a user site 100 to each other.

FIG. 4 shows an example of the topology information retained on the network management device 10 at that time. The link bandwidth is described in Mbps as its unit. (Note that part of the topology information is shown by way of an extract for simplicity. Pieces of information about the relay network through the sites such as a port number of the access link, etc. are not shown therein.)

FIG. 5 is a diagram showing an example of user information of the individual user site 100. The site accommodation node connotes the point-to-point link relay node N to which the site 2 is connected via the access link.

Figure 6:
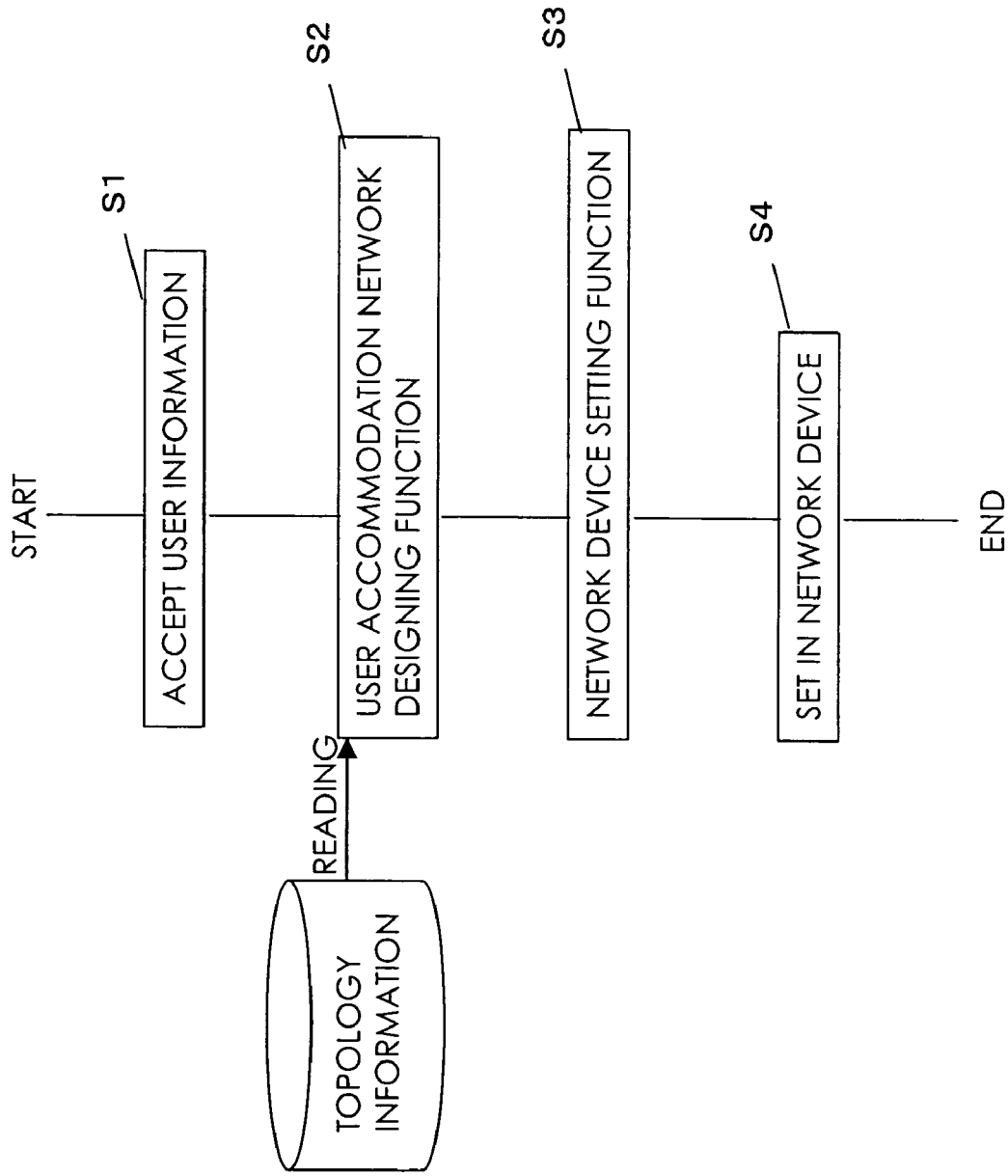
FIG. 6 is a flowchart of a route designing method.

Then, FIG. 6 is a flowchart showing procedures of the route design by the network management device 10.

(Step 1)
To start with, the operator operates a keyboard on the network management device 10, thus inputting the bandwidth information of the access link serving as the link for establishing the connection of the individual user site 100 to the relay node N and the user information such as a piece of information indicating the relay node to which the user site is connected via the access link, etc., and thereupon the network management device 10 accepts and stores the user information on the storage unit 13.

(Step 2)
Next, in the network management device 10, the topology acquisition unit acquires the topology information of the network across which the communications between the user sites are relayed, from the topology information database in the storage unit 13.

(Step 3)
Further, in the network management device 10, the route designing unit obtains the communication relay ports and the communication non-relay ports on the basis of the user information and the topology information, and also obtains upper limits of the communication relay ports, thereby making a route design for connecting the user sites along a tree-shaped route.

(Step 4)
Then, the network management device 10 outputs (transmits), based on a result of the route design, the setting information containing the information showing the communication relay ports and the communication non-relay ports with respect to the respective relay nodes N and the information showing the upper limits of the communication bands of the communication relay ports to the respective relay nodes N. Each of the relay devices that have received the setting information updates, based on the setting information, the VLANID-to-queue mapping table and the queue transfer rate table of each port, and makes the setting to relay the user traffic along the route described above. Incidentally, the scheme in the embodiment 1 is that the network setting unit (the route output unit) of the network management device 10 sets the route in each of the relay nodes by outputting the setting information, however, without being limited to this scheme, there may be another scheme in which the setting information or the result of the route design is simply displayed (outputted to) on a display or outputted for printing, and, for the setting of each relay node, the operator manually sets while looking up this output.

The allocation of the VLANIDs to the individual users may involve the use of, for instance, what has been determined by the operator and may also be properly made by the accommodation network designing function so as not to overlap. In any case, there shall be a format enabling recognition of mappings between the users, the VLANIDs that should be allocated thereto by the network management device 10, and the ports of the respective relay nodes.

For example, it is assumed that A is a VLANID allocated to the user information containing the information shown in FIG. 5 and that the result of having made the route design based on the user information in FIG. 5 becomes as shown in FIG. 7. What implies in FIG. 7 is that a port 1 is capable of transferring a frame having the VLANID "A" with respect to the node 1 and an output rate (a communication band) thereof is 20 Mbps at the maximum. In this case, if an Ether frame having a frame tag that defines the VLANID "A" is reached at a speed (e.g., 25 Mbps) exceeding 20 Mbps from the user site 100, the node 1 discards extra 5 Mbps in the output queue of the output port 1. Further, this implies, though there is none of the description about the port 2 of the node 1, that the frame having the VLANID "A" is untransferable to the port 2.

Figure 8:
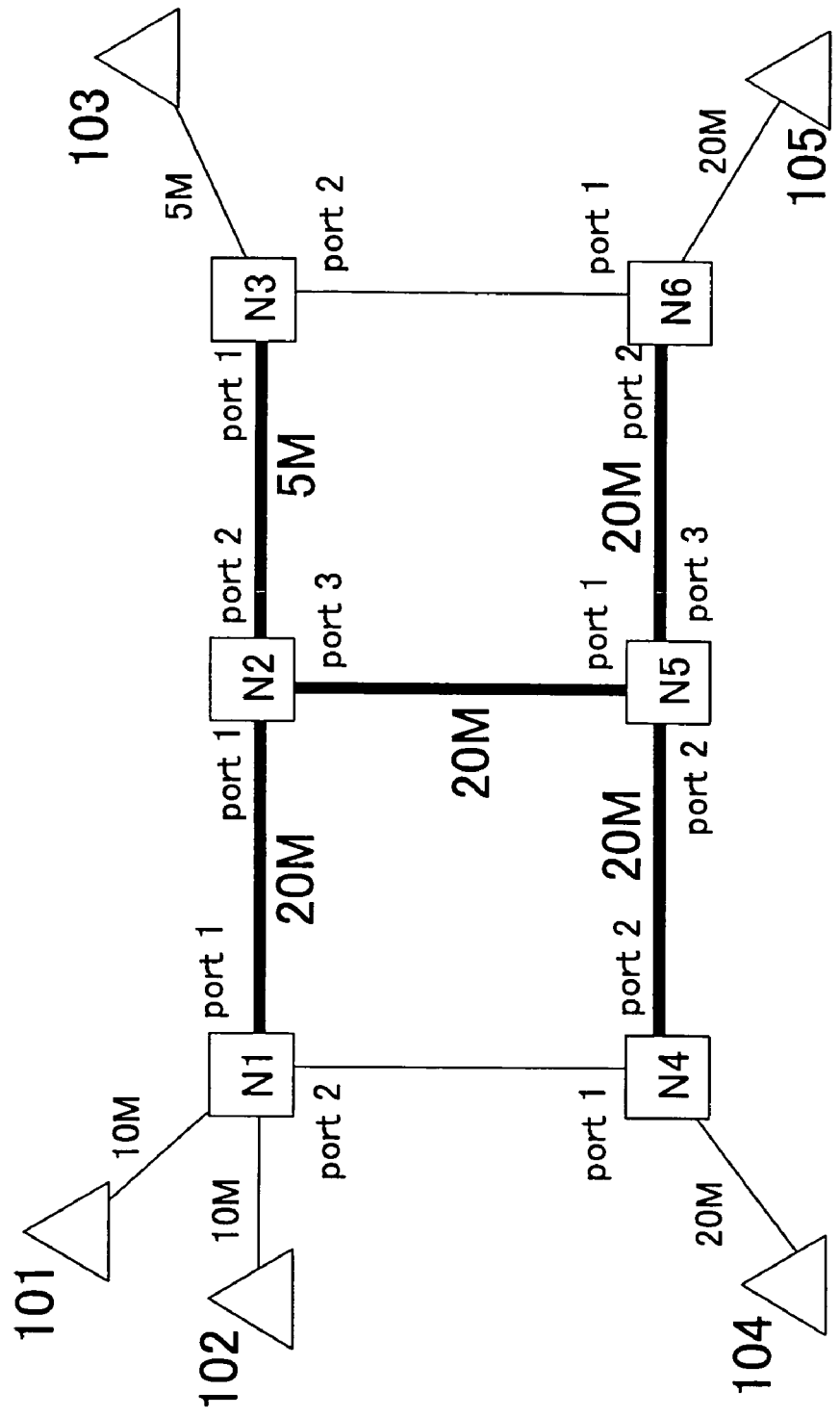
FIG. 8 is a diagram showing a result of the design for the user information in FIG. 5.

The network setting unit of the network management device 10 has the setting effected by transmitting the result of the route design to each of the relay nodes N. This setting is carried out by doing, for instance, a remote login to a setting target relay node by Telnet via the setting network 4 and by inputting the setting command (setting information). A selection of what type of command is concretely employed depends on s of the relay node N, however, whatever commands are usable if what implies in FIG. 7 is set. As a result of thus setting, it follows that the setting as shown in FIG. 8 is done for this user traffic (a frame of VLANID "1") on the network. A broadcast domain is depicted by a bold line in FIG. 8. Further, as shown in FIG. 8, in the network management device 10 in the embodiment 1, a design is made so that a tree-shaped route extends from an arbitrary user site 100 to other user sites 100.

As described above, according to the embodiment 1, the route for efficiently accommodating the user traffic and the allocation bandwidth are determined, and besides the result thereof can be automatically set in the network device, whereby a labor and time needed for the operation can be restrained.

Embodiment 2

As compared with the embodiment 1 discussed above, an embodiment 2 has a different method of allocating the communication bands by the route designing unit, and other configurations are the same. Therefore, the repetitive explanations of the same configurations as those in the embodiment 1 discussed above, are omitted.

The route designing unit in the embodiment 2 obtains the route that connects all the user sites in the same way as the above-mentioned, and allocates the communication bands so that an upper limit of the communication bandwidth allocated to an arbitrary port is equal to or lower than a sum of upper limits of the communication bands allocated to other ports. Namely, the smaller of total values of the traffics relayed by the relay nodes N at both ends of each link on the route, is adopted as an allocation band.

The allocation bands herein indicate output rates allocated to the output ports at both ends thereof. The link allocation bands are determined, and the output rates of the ports at both ends thereof are determined based on these bands.

The allocation of the link bands can be actualized according to the following method.

At this time, the route designing unit defines a processing flag for each of the relay nodes N. For example, the processing flag associated with each relay node N is stored on the memory and is, when starting the route design, initialized so that a value of this flag is set to 0, i.e., in a not-yet-processing state, while a value of the flag associated with the relay node N with the allocation bandwidth determined is set to 1, viz., in an already-processing state. Based on this processing flag, the following three steps are executed. Note that this algorithm is performed after the route has been given, and is therefore ignored for the traffic non-relay ports (the link).

(Step 11)

There is selected one of the relay nodes N with their processing flag being 0 and with a small number of links where the bands are not yet set (which are the nodes having one single link where the bands are not yet set).

(Step 12)

With respect to this selected relay node N, the bandwidth (which is i.e., the bandwidth of the port for relaying the traffic via the link and will hereinafter simply be also called a link band) of the node-connected link, is set equal to or smaller than a total sum (=α) of the bands allocated to other links connected to that node. To be specific, the setting follows the condition (a) through the condition (c) given hereunder.

(a) α is set in the link where the bandwidth is not yet set.
(b) As for the link where the bandwidth has already been set, if this bandwidth is larger than the total sum α, α is set therein. In this case, the calculation (algorithm) needs re-operating on the other side across this relay node, and hence the processing flag of the other point-to-point link node is set to 0.
(c) As for the link where the bandwidth has already been set, if this bandwidth is equal to or smaller than α, the bandwidth remains unchanged.

After finishing the processing for all the links, the processing flag of that relay node N is set to 1.

(Step 13)

Steps 11 through 12 are repeated till the relay nodes N with the processing flag being 0 disappear.

The following is a concrete example. In FIG. 9A, an assumption is that the triangles 101 through 103 represent the user sites, and the squares N1 through N3 denote the relay nodes N assigned by way of the route along which this user traffic (VLAN) is forwarded within the relay network. At this time, it is presumed that the site 101 subscribes 50 M as an access link band, the site 102 subscribes 20 M, and the site 103 subscribes 20 M. Herein, the port for relaying the traffic via a link 1-3 and a link 2-3 is a bandwidth allocating target. Note that the state of the processing flag as employed in the algorithm is expressed by putting a mark "X" on the relay node. The processing flag is set to 1 in the relay nodes N with the mark "X", while the processing flag is set to 0 in the nodes with none of the mark "X".

To begin with, there are selected the relay nodes with the processing flag being 0 and having a minimum number of relay links where the bands are not yet set (step 11). Herein, candidates are the relay nodes N1 and N2. At first, the relay node N1 of these nodes is selected (for instance, if there are a plurality of candidates, one of them is selected in the sequence from the smallest in ID value), 50 M as the total sum of the bands of other links is set in the link 1-3, and the processing flag of the relay node N1 is set to 1 (step 12). Then, there are still the nodes with the processing flag being 0, and hence the operation returns to step 11 (step 13).

Next, the relay node N2 is selected (step 11), 20 M as the total sum of the bands of other links is set in the link 2-3, and the processing flag of the node N2 is set to 1 (step 12). FIG. 9B shows how the bands have been allocated so far.

Then, since there exist the relay nodes N with the processing flag being 0, the operation gets back to step 11 (step 13), wherein the relay node N3 is selected (step 11). The link 2-3 may remain as it is under the condition (c), however, as the bandwidth of the link 1-3 is equal to or larger than the total sum of other link bands (50 M>20 M+20 M), a bandwidth given by 20 M+20 M=40 M is set in the link 1-3 under the condition (b), then the processing flag of the relay node N1 as the other point-to-point link node is set to 0, and at the same time the processing flag of the relay node N3 is set to 1 (step 12). FIG. 9C shows how the bands have been set so far.

There are the relay nodes N of which the processing flag is 0, and hence the operation returns to step 11 (step 13), wherein the relay node N1 is selected (step 11). Under the condition (c), this node may remain unchanged, and the processing flag is set to 1.

As the nodes with the processing flag being 0 disappear, and therefore the processing is terminated (step 13). Consequently, the bands are set as in FIG. 9D.

Thus, according to the embodiment 2, when transmitting the traffic from each of the nodes in the relay network, it is possible to attain such a bandwidth allocation as to discard an excess over the allowable traffic quantity on the other side across the point-to-point link node of this transmission link, and a futile traffic transfer across the relay network can be avoided (the bands for only the traffic that the user can substantially flow are to be allocated).

Figure 10:
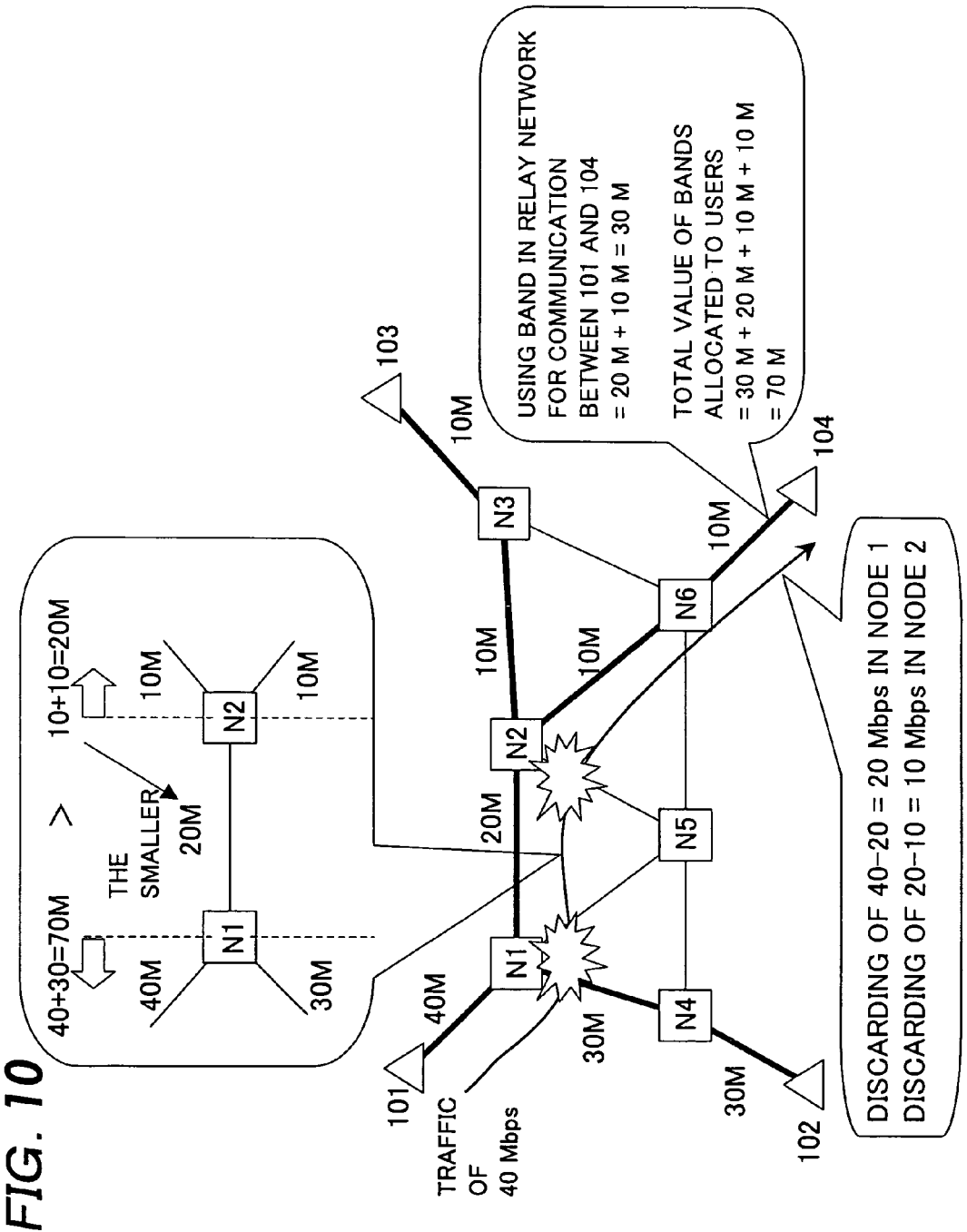
FIG. 10 is a view showing an example of the bandwidth allocation.

Example: In the link 1-2 (the link between the nodes N1 and N2) in FIG. 10, the node 1 is capable of relaying with a bandwidth given by 40 M+30 M=70 M, while the node N2 is capable of relaying with a bandwidth given such as 10 M+10 M=20 M, and therefore the smaller, i.e., 20 M is set as the allocation band.

As the bands within the relay network have hitherto been so allocated as to be generally given latitude, in the case of transmitting a 40 Mbps traffic to a user site 104 from the user site 101, the relay node N6 discards a 30 Mbps traffic, and it follows that the traffic of only 10 Mbps reaches the user site 104. This therefore implies that the relay network has relayed a futile traffic as large as 30 Mbps, resulting in a factor of decreasing a network utilizing efficiency.

By contrast, in the relay network where the route design is made as in the embodiment 2, the bandwidth of each link is set based on the user information (the bandwidth of the access link). Therefore, in the case of transmitting the 40 Mbps traffic to the user site 104 from the user site 101, the relay node N1 discards the 20 Mbps traffic, and the relay node N6 discards the 10 Mbps traffic, with the result that 10 Mbps traffic reaches the user site 104. Thus, the futile traffics are discarded at an early stage (by the relay nodes N on an upstream side), whereby the network can be efficiently utilized.

Embodiment 3

As compared with the embodiment 2 discussed above, an embodiment 3 has a different method of determining the communication route by the route designing unit, and other configurations are the same. Therefore, the repetitive explanations of the same configurations as those in the embodiment 2 discussed above, are omitted.

In the case of using the bandwidth allocating method according to the embodiment 2 discussed above, the route having the minimum consumable bandwidth invariably exists on a shortest route tree in which any one of the nodes within the relay network serves as an origin (root).

Such being the case, it is possible to determine the route having the minimum consumable bandwidth at a low cost of calculation (algorithm) in the case of effecting the bandwidth allocations.

Namely, the routing setting unit of the network management device 10 obtains the shortest route trees with the respective relay nodes each serving as the root, then acquires the routes by removing the links and the nodes unrelated to the traffic relay out of the trees, trying the bandwidth design for each of the acquired routes (the shortest route tree), and the route having the minimum consumable bandwidth as a result of this trial is selected.

To be specific, the route design is actualized by the following method.

Figure 12:
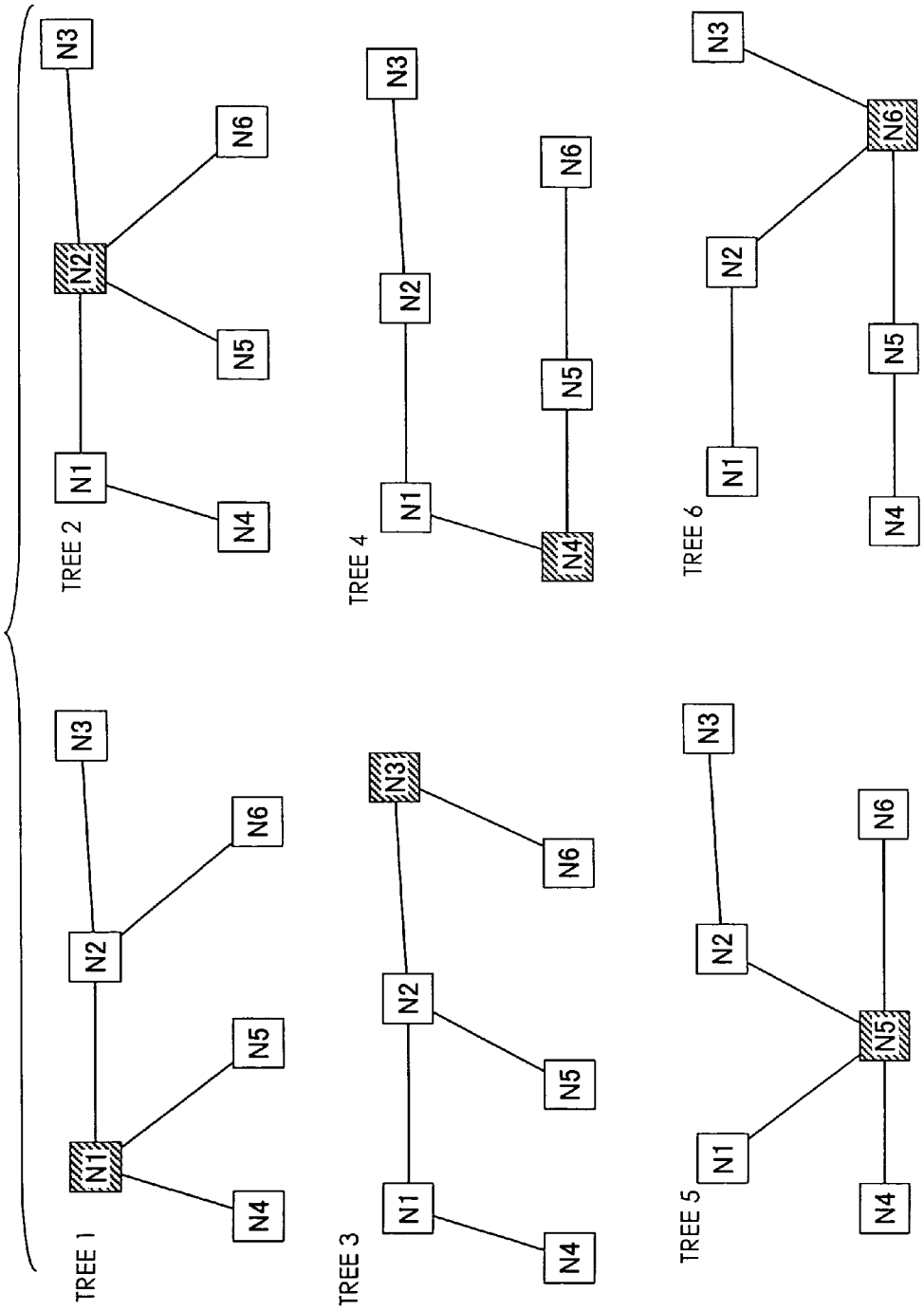
FIG. 12 is a view showing an example of a shortest route tree.
Figure 13:
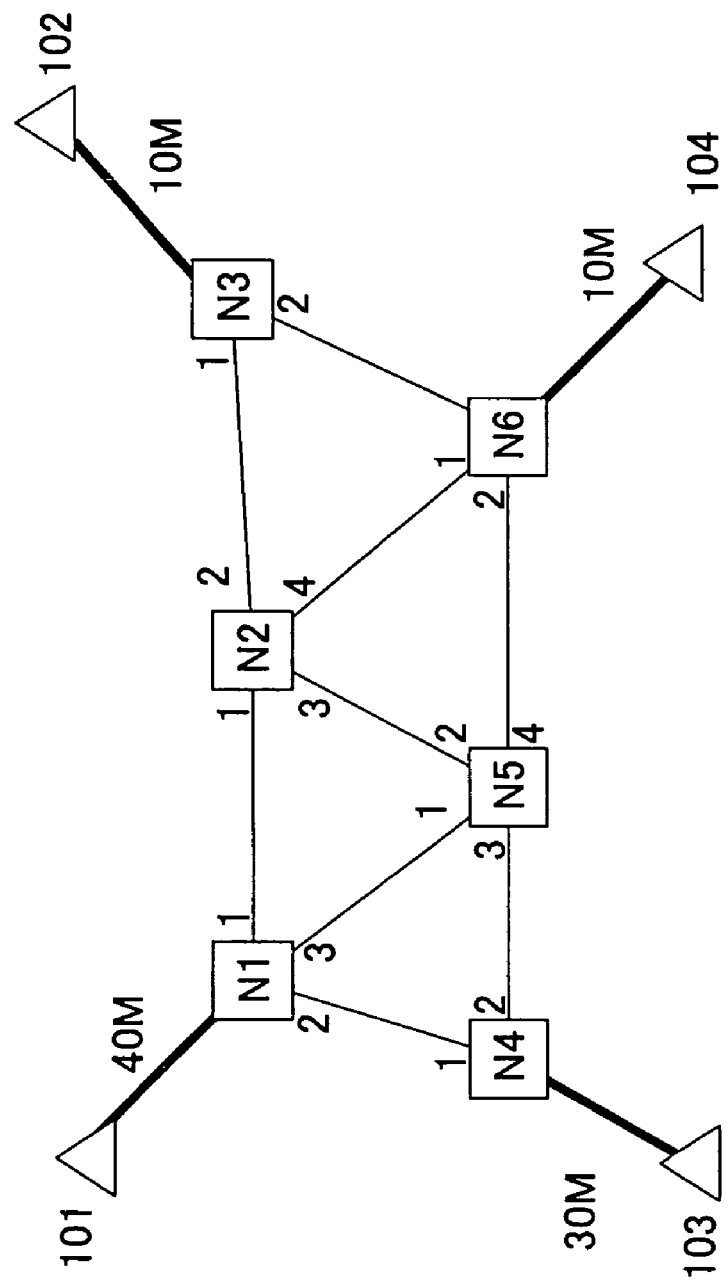
FIG. 13 is a view showing an example of a network architecture.

An assumption in this example is that a route accommodating the traffic of a user having the user information shown in FIG. 11, is designed for the network illustrated in FIG. 13. At this time, the route designing unit calculates totally six patterns of shortest route trees on the basis of the topology information shown in FIG. 14, wherein each of nodes N1 through N6 in the relay network serves as an origin (root) node Nr. The shortest route tree can be obtained by use of the calculation algorithm for obtaining such a tree as to minimize a cost from the root node Nr, wherein a cost of each link is set to, for example, 1. For instance, Dijkstra algorithm is a highly well-known algorithm. Supposing that the cost of each link is set to, e.g., 1, it follows that a shortest hop-by-hop route from the root node Nr is obtained. Herein, a shortest route tree originating from a node X as a root is referred to as a tree X. FIG. 17 shows an example of a result of the processing by the Dijkstra algorithm with respect to the tree 1. A parent node is defined as a node disposed closer by one node to the root node when reaching along a minimum cost route from the relay node to the root node Nr (which is the shortest hop-by-hop route in this case). The parent node is expressed by "_ _" with respect to the node 1, which indicates that the node itself is the root node Nr. In fact, a numerical value such as 0 representing the root node Nr is stored. FIG. 12 is a pictorial representation thereof. The node marked with hashing is the root node Nr of each three. Next, the route designing unit executes the following process in order to eliminate the nodes unrelated to those accommodating the user traffic.

(Step 21)

To start with, on the basis of the user information of the user concerned, there is defined a condition (that the node is not, for instance, a site accommodation node connected to the user site of the user concerned but is a node of which a port count is 1) for specifying the relay node N that does not relay the user traffic.

(Step 22)

Next, it is judged by referring to site accommodation node information in FIG. 11 whether or not there is a relay node applicable to the condition given above from each tree, i.e., a node unrelated to the relay of the user traffic. If there is no relay node applicable to this condition, there are none of the unrelated nodes, and therefore the processing is terminated. Further, whereas if there is the relay node applicable to the condition, the processing proceeds to next step 22.

(Step 22)

The relay node N applicable to the condition given above and the links connected to this relay node are excluded from the topology information of the design target.

(Step 23)

Then, the processing returns to step 21, wherein the steps are repeated till the relay nodes applicable to the condition disappear.

Figure 15:
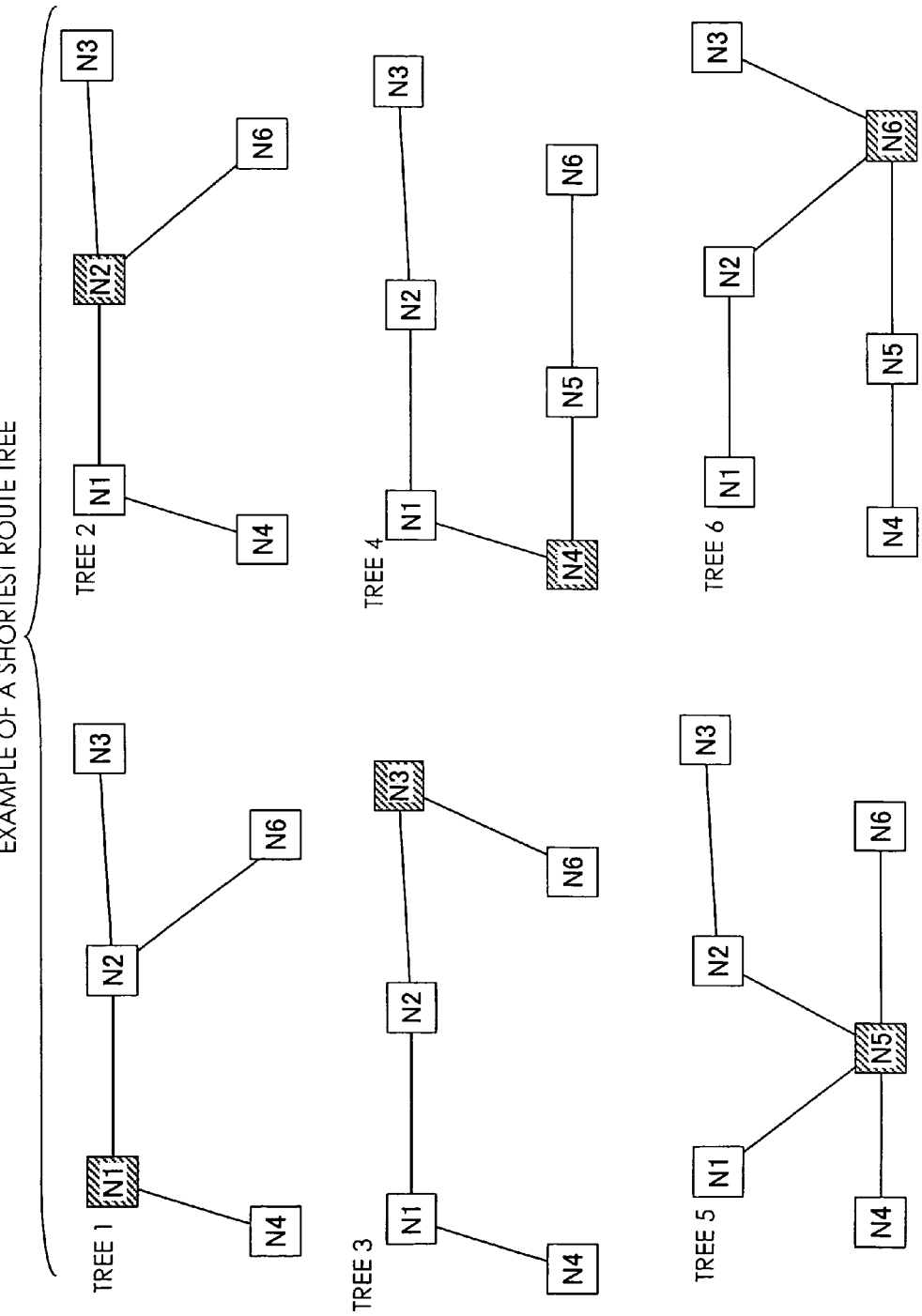
FIG. 15 is a view showing an example of the tree after excluding nodes.
Figure 16:
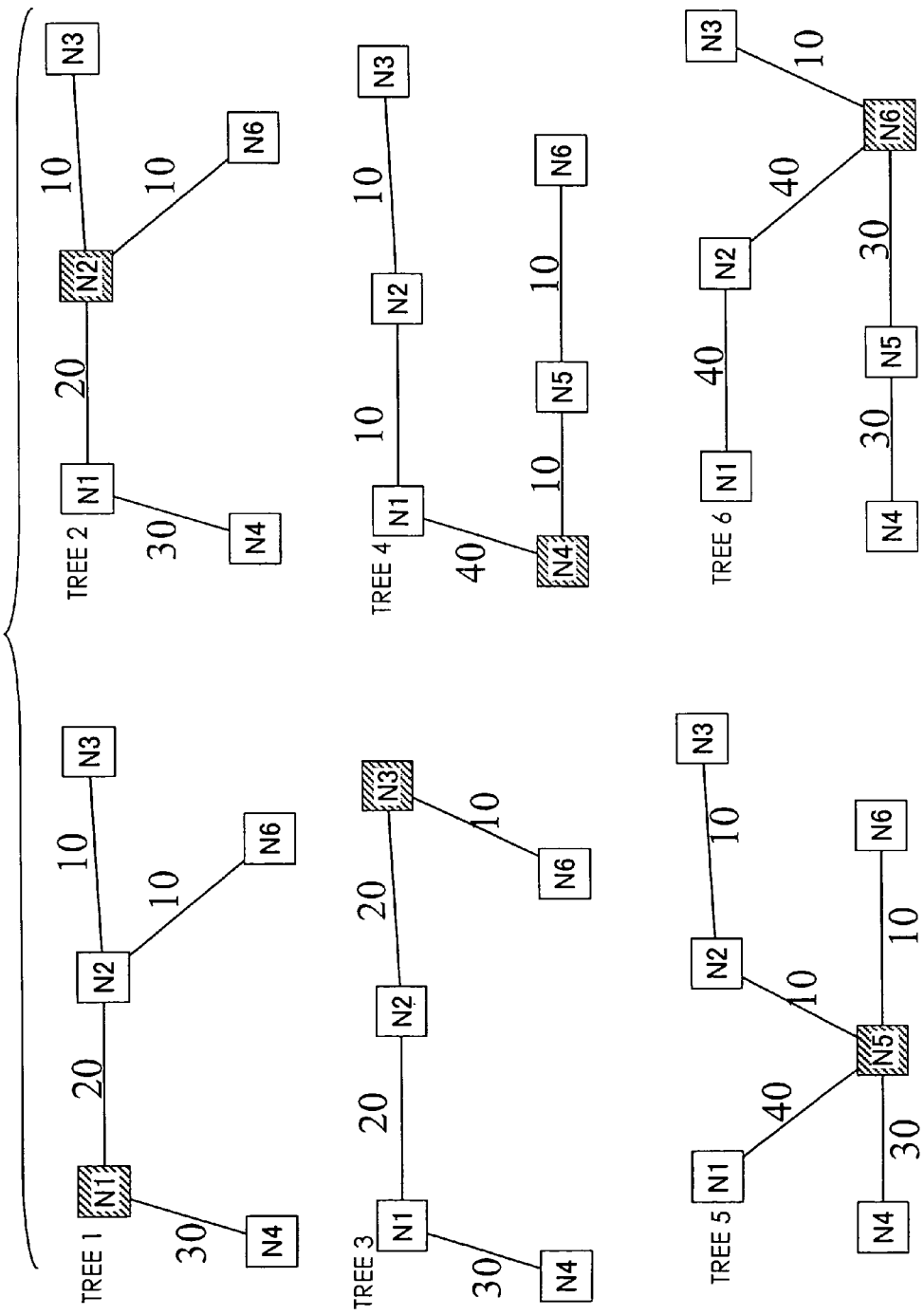
FIG. 16 is a view showing a result of the bandwidth allocation.

As a result of this processing, as shown in FIG. 15, the tree-shaped routes excluding the unrelated relay nodes and links are acquired. The bandwidth allocation is tried for each of the routes. FIG. 16 shows results of the trials. When making a comparison between the consumable bands of the respective trees, a tree 1 has 70 Mbps, a tree 2 has 70 Mbps, a tree 3 has 80 Mbps, a tree 4 has 80 Mbps, a tree 5 has 100 Mbps, and a tree 6 has 150 Mbps. In this case, the tree 1 or 2 is selected as a minimum consumable bandwidth tree.

Thus, according to the embodiment 3, the bandwidth allocation is obtained in a way that eliminates the relay nodes unrelated to the relay, and hence the cost for the calculation (algorithm) is restrained lower than by obtaining it in a round-robin manner about the nodes contained in the network. Then, it is feasible to easily determine such a route as to minimize the consumable bandwidth at the calculation cost to such a degree as to be given by (Calculation of Shortest Route Tree)×(Number of Relay Nodes).

Embodiment 4

As compared with the embodiment 3 discussed above, an embodiment 4 has a different method of determining the communication route by the route designing unit, and other configurations are the same. Therefore, the repetitive explanations of the same configurations as those in the embodiment 3 discussed above, are omitted.

As described also in the embodiment 3, the route, which minimizes the consumable band, invariably exists on the shortest route tree in which any one of the nodes within the relay network serves as the origin (root). This being the case, the embodiment 3 is characterized by efficiently discovering the root node of the shortest route tree including a desired route.

Specifically, the route design is carried out by the following method.

The route designing unit of the network management device 10 evaluates each of the relay nodes N by the following evaluation formula, and selects the relay node N exhibiting a minimum evaluation value.

Total evaluation value of the Node $a$ = $\Sigma_{i \in (all\ sites\ accommodation\ node)}$ {Evaluation value of node a in tree $i$ }

Evaluation value of node $a$ in tree $i$ = (Shortest Hop Count between Site Accommodation Node $i$ and Node $a$)×(Subscription Bandwidth of Access Link Connected to Site Accommodation Node $i$)

An assumption in this example is that the route accommodating the traffic of the user having the user information shown in FIG. 11 is designed for the network illustrated in FIG. 13. At this time, the route designing unit calculates, based on the topology information shown in FIG. 14, the shortest route tree in which the relay node N included in the relay network is set as the origin (root) node Nr. Note that the shortest route tree with the site accommodation node serving as the root node Nr is obtained for restraining the cost for the calculation according to the embodiment 4. Namely, the relay nodes N1, N3, N4, N6 serves as objects of the root nodes, thus obtaining the trees 1, 3, 4, 6. The method of obtaining the shortest route tree may be the same as the aforementioned.

Figure 18:
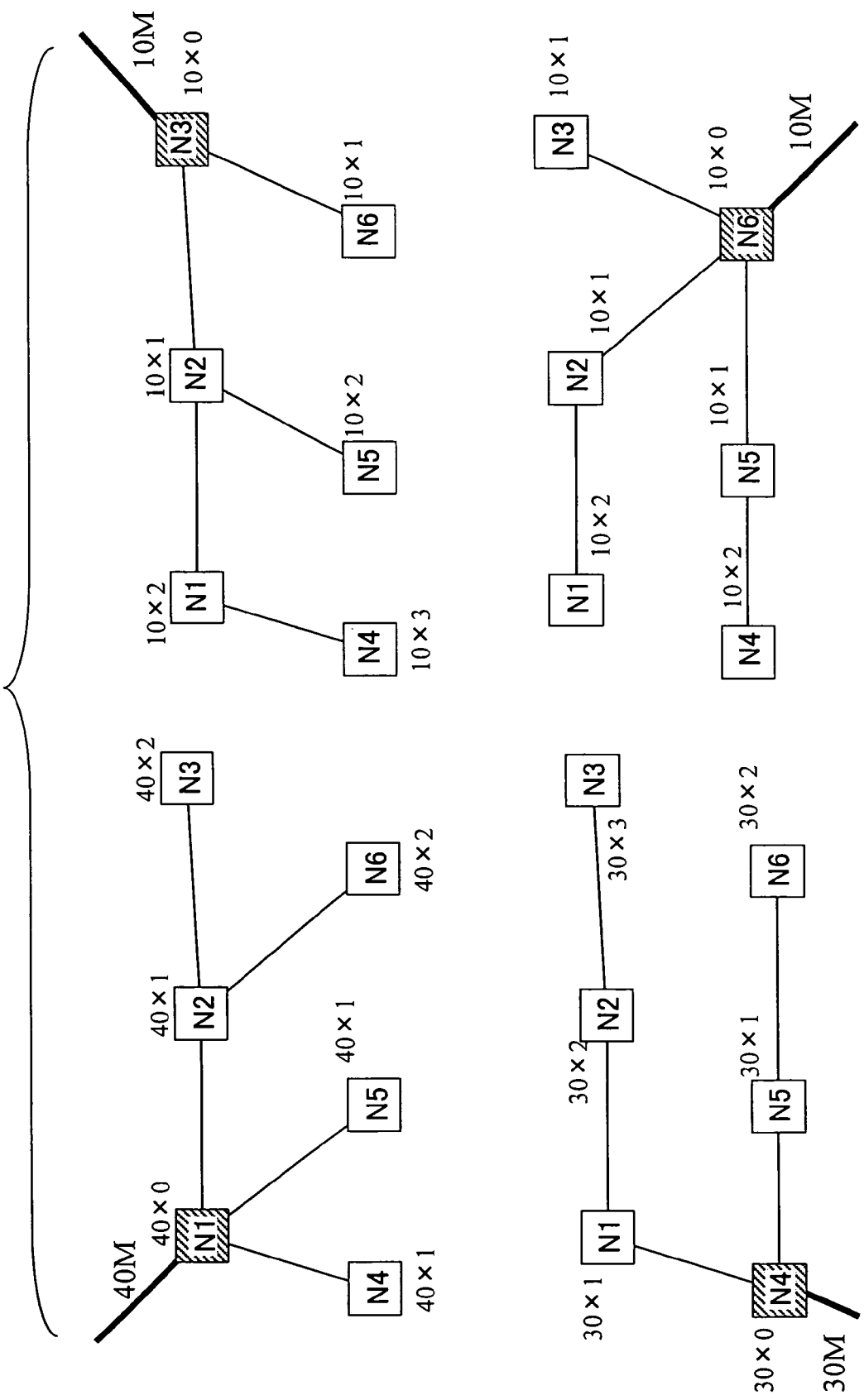
FIG. 18 is a view showing an example of evaluation values on the trees.

Then, an evaluation value of the node a in each of the trees is obtained. This evaluation value is easily obtained by use of a result of the processing based on the Dijkstra algorithm. FIG. 18 shows how the evaluation value is acquired. In the tree 1 in FIG. 18, the node N2 is marked with "40×1", and this is the evaluation value of the relay node N2. This evaluation value represents (Subscription Bandwidth of Access Link Connected to Relay Node N1=40 Mbps)×(Hop Count from Node N1=1). The unit of the subscription band, which is employed for calculating the evaluation value, may be properly changed, however, the same unit is applied to the calculation throughout the entire trees during the design for the same user. In this case, the calculation is handled in Mbps.

After obtaining the evaluation values of all the trees 1, 3, 4, 6 in the respective nodes N1, N3, N4, N6, a total evaluation value of each of the nodes N1, N3, N4, N6 is obtained. This total evaluation value is obtained by taking a sum of the evaluation values of all the trees in the respective nodes. In the case of the relay node N2, a value 120 as a sum of an evaluation value 40 in the tree 1, an evaluation value 30 in the tree 3, an evaluation value 60 in the tree 4 and an evaluation value 10 in the tree 6, is the total evaluation value to be obtained. After obtaining the total evaluation values of all the nodes N1, N3, N4, N6, one node exhibiting the minimum total evaluation value is selected. In this case, 70 of the relay node N1 is the minimum value, and hence the route designing unit selects the relay node N1. The selected relay node N1 becomes the root node Nr of the shortest route tree as the route accommodating the user traffic.

Figure 19:
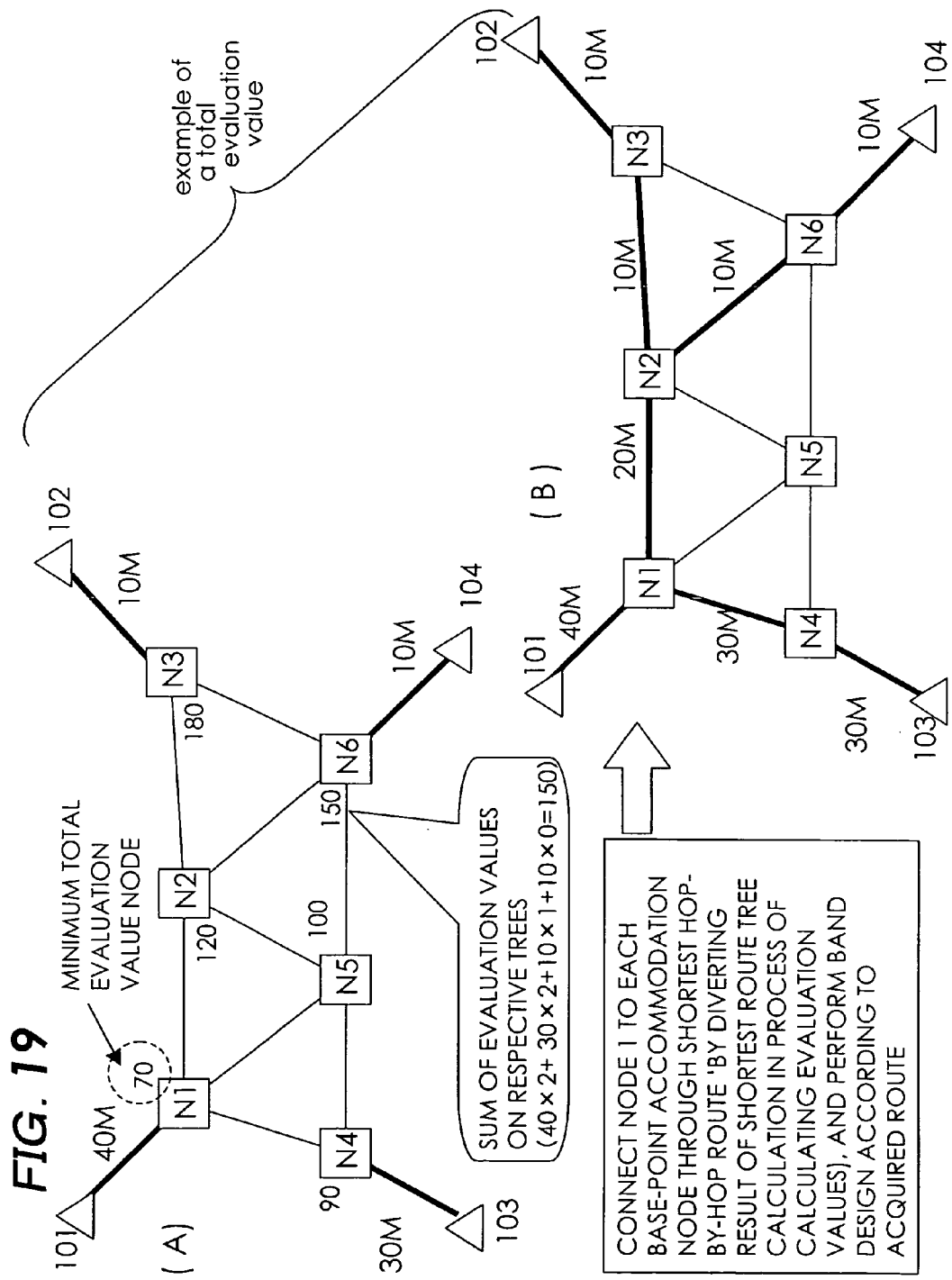
FIG. 19 is a view showing an example of a total evaluation value.

Then, the route designing unit determines the route (the shortest hop-by-hop route) that connects the selected node as the root node Nr to each of the site accommodation nodes. The shortest hop-by-hop route that connects the selected node to each of the site accommodation nodes, may be calculated on another occasion and may also be obtained by retaining the result of the Dijkstra calculation when performing each tree calculation up to this point of time and diverting this calculation result. In the latter case, a route between, for example the nodes 1 and 6 is acquired by searching for the node 1 in the tree 6 and finding out a parent node N2 thereof and a further parent node N6 of the node N2 in sequence. FIG. 19 shows these operations. A result o the design in FIG. 19 is expressed as, e.g., FIG. 33 illustrates.

According to this method, a cost for calculation is given such as (Calculation of Shortest Route Tree)×(Number of Sites). Namely, in an environment where a design object has a size such as (Number of Sites)<(Number of Relay Nodes), a much greater effect than by the method in the embodiment 3 is exhibited.

For example, in the case of performing the route design for ten sites of the users by using 10000 as the number of nodes, approximately 5 hours are required for a case of conducting the route design by obtaining the shortest route trees with respect to all the relay nodes. By contrast, in the case of performing the route design by the method in the embodiment 4, the calculation time is on the order of one minute.

Embodiment 5

As shown in the embodiment 3 discussed above, in regards to the route excluding the relay nodes that do not relay the communications between the user sites, the communication bands may be allocated so that the upper limit of the communication bandwidth allocated to an arbitrary port of each relay node is set equal to or smaller than the sum of the upper limits of the communication bands allocated to other ports as exemplified in the embodiment 2 discussed above.

This scheme enables the bands to be allocated in a way that eliminates the relay nodes unrelated to the relay of the traffic, whereby the route design can be conducted by the much easier processing.

Embodiment 6

As exemplified in the embodiment 4 discussed above, there are obtained the relay node selected based on the evaluation value and the shortest hop-by-hop route established by connecting the respective sites with the minimum hop count. As for the shortest hop-by-hop route, as exemplified in the embodiment 2 discussed above, the communication bands may be allocated so that the upper limit of the communication bandwidth allocated to the arbitrary port of each relay node is set equal to or smaller than the sum of the upper limits of the communication bands allocated to other ports.

With this scheme, the bands may be allocated with respect to only the shortest hop-by-hop route, and the route design can be performed by the easy processing.

Embodiment 7

An embodiment 7 has, as compared with the embodiment 4 discussed above, a difference in terms of previously obtaining the tree-shaped shortest route in which the node capable of becoming the site accommodation node serves as the root, and other configurations are the same. Therefore, the repetitive explanations of the same configurations as those in the embodiment 4 discussed above are omitted.

The embodiment 4 discussed above shows the design method based on the scheme of obtaining the shortest route tree in which the based-point accommodation node serves as the root. Pieces of information that are referred to when making the design are the design target user information and the topology information. The embodiment 7 aims at reducing a route designing time by previously obtaining this shortest route tree.

To attain this aim, according to the embodiment 7, the route designing unit obtains beforehand, with respect to all the relay nodes N each possible of becoming the site accommodation node, the shortest route tree in which this relay node servers as the origin (root), and stores (retains) a result thereof on the storage unit 13.

The relay node N possible of becoming the site accommodation node is, to be specific, a node positioned at the end of the relay network in terms of the topology. (The nodes in the relay network can be understood in many cases as being classified generally into those disposed only for forwarding the traffic inside and those disposed for the purpose of being connected to the user sites without being limited to the traffic forwarding, and, according to the present method, the nodes in the latter case are understood as being capable of becoming the site accommodation nodes.)

In the case of acquiring the topology information, before the user information is given, the relay nodes possible of becoming the site accommodation nodes are extracted beforehand, then the shortest route trees with these nodes each serving as the root are created, and pieces of information about these trees may be retained. For extracting the relay nodes N possible of becoming the site accommodation nodes, for example, the operator may manually input the nodes possible of becoming the site accommodation nodes into the acquired topology information, and the nodes that have already accommodated other user sites are designated by identifying and automatically inputting them, whereby there may be retained the topology information with an addition of an element (a candidate for the site accommodation node) that is possible or impossible of becoming the site accommodation node when accepting the user information. For instance, in the network shown in FIG. 13, the element (the candidate for the site accommodation node) that is possible or impossible of becoming the site accommodation node, is added to the topology information (FIG. 14) described above, and the topology information is stored in the topology information database as shown in FIG. 20. Referring to FIG. 20, in a case-point accommodation node candidate field, a node of 1 is the node possible of becoming the site accommodation node, whereas a node of 0 is the node impossible of becoming the site accommodation node.

The route designing unit, when given the topology information, extracts the relay nodes N possible of becoming the site accommodation nodes and creates and stores a tree table as shown in FIG. 21A-21D on the storage unit 13.

Then, on the occasion of accepting the user information and performing the route design, the route designing unit makes not the calculation of the shortest route tree but the acquisition of the relevant trees by searching for them from the tree table.

Once the tree table is created, this method makes it feasible to reduce a labor for performing the calculation of the shortest route tree each time the user network accommodation design is made, and therefore the designing time of the individual user can be restrained.

Embodiment 8

An embodiment 8 has, as compared with the embodiment 3 or 4 discussed above, a difference in terms of previously excluding the relay nodes and the links unrelated to the route design out of the topology information of the design object, and other configurations are the same. Therefore, the repetitive explanations of the same configurations as those in the embodiment 3 or 4 discussed above are omitted.

The embodiment 8 aims at, after the user information has been given, saving the labor for the calculation of the design and restraining the designing time.

The nodes and links unrelated to this route design are the nodes and the links that do not relay the communications between the user sites. Specifically, these nodes and links indicate "the relay nodes that are not the user site accommodation nodes, of which the port count is 1, and the links connected to these relay nodes". In the embodiment 8, this is called a delete condition. If the relay nodes which meet the delete condition are detected, these relay nodes N and the all the links 3 connected to these nodes N are deleted from the design targets. In the case of deleting the links 3, port data of the other point-to-point link nodes are also deleted. If the information on the nodes N and the links 3 is completely deleted from the topology information database, however, the complete deletion might cause a trouble to the future designs. Therefore, the information about the nodes N and the links 3 is removed from the topology information that is read into the memory when the route designing unit makes the route design, and the information is thus used. The deletion shall be the deletion from the read-out information.

Figure 22:
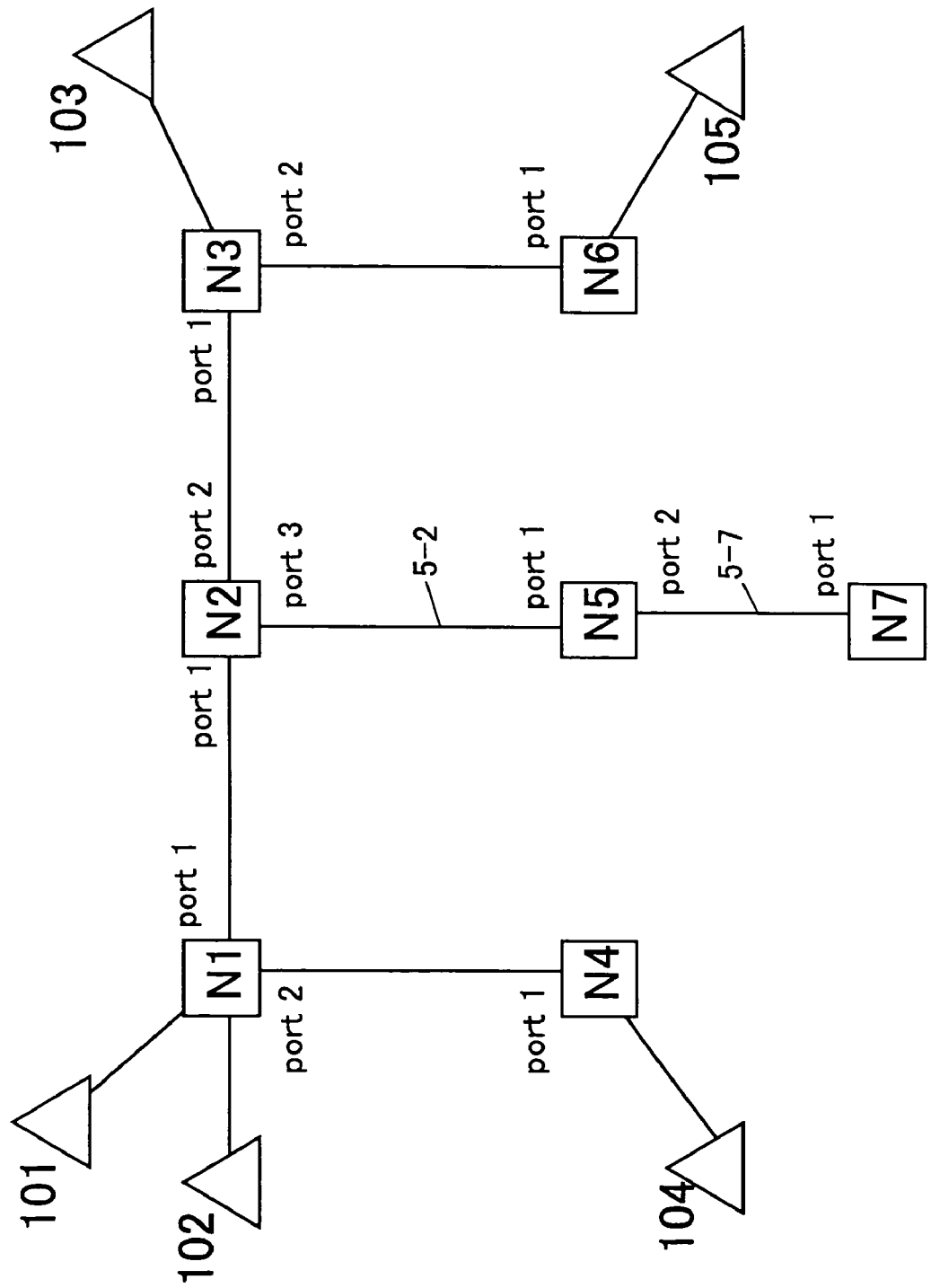
FIG. 22 is a diagram showing an example of a network architecture.

In a network (NW) as shown in FIG. 22, in the case of acquiring the topology information shown in FIG. 23, of storing the topology information on the topology information database and of being given the user information shown in FIG. 5, the route designing unit, after reading the topology information into the memory, searches the topology information for a relay node that meets the delete condition on the basis of these pieces of topology information. In this case, a relay node N7 conforms with this node. The route designing unit deletes the relay node N7 and a link 5-7 from the readout topology information. After the deletion, the topology slightly changes, and hence the route designing unit checks again whether there is a node that meets the delete condition. In this case, in the topology information after the deletion, the relay node N5 is detected afresh as a delete target, so that the node N5 and a link 5-2 are deleted. Through these processes, the delete target topology information becomes what is shown in FIG. 24.

After executing the processes described above, the labor taken for, e.g., the Dijkstra calculation is greatly reduced by effecting the route design, and therefore the design time required of each individual user can be largely decreased.

Embodiment 9

An embodiment 9 has, as compared with the embodiment 8 discussed above, a difference in terms of excluding the relay nodes and the links unrelated to the route design per sub-domain out of the topology information of the design object, and other configurations are the same. Therefore, the repetitive explanations of the same configurations as those in the embodiment 8 discussed above are omitted.

Figure 25:
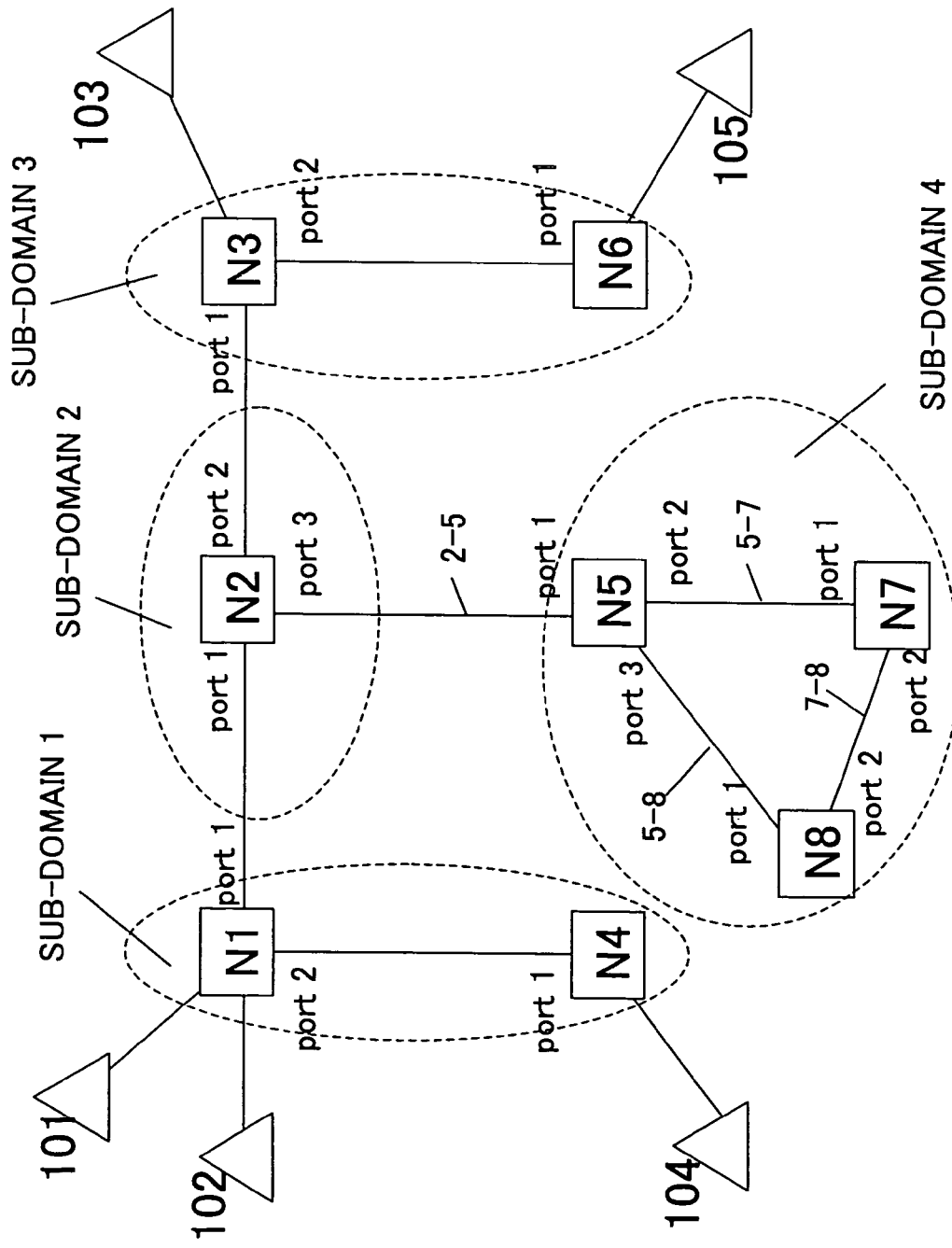
FIG. 25 is a view showing an example of a hierarchized network architecture.

For simplifying the management, the relay network might be dealt with in a way that hierarchizes the network. FIG. 25 shows an example thereof. Herein, the nodes surrounded with a dotted line is dealt with as one sub-domain. The relay nodes N1, N4 are defined as a sub-domain 1, the relay node N2 is defined as a sub-domain 2, the relay nodes N3, N6 are defined as a sub-domain 3, and the relay nodes N5, N7, N8 are defined as a sub-domain 4. For example, these sub-domains are dealt with in a way that adds, for instance, sub-domain attributes to the topology information. FIG. 26 shows an example thereof. The embodiment 9 has a scheme of deleting the nodes and the links unrelated to the user sites from the design object for every sub-domain on the occasion of deleting them under the same delete condition as that in the embodiment 8 discussed above.

For attaining the sub-domain-by-sub-domain deletion, for instance, as shown in FIG. 27, it might be enough if there is sub-domain information containing an element representing whether the sub-domain is a sub-domain including the site accommodation node. Herein, the sub-domain containing "1" entered in a site accommodation candidate field is a sub-domain including the site accommodate node candidate (possible of becoming the site accommodation node), and "0" entered therein indicates a sub-domain including none of such a candidate. The sub-domain information is previously inputted to the topology information database by the operator, and, after giving, e.g., the topology information as shown in FIG. 26, there may be created a table in which belonging sub-domain IDs and site accommodation candidates, which are contained in the topology information, are associated with each other.

After preparing the (topology) information in FIG. 26 and the (sub-domain) information in FIG. 27, on the occasion of starting the design of the user accommodation network, the process of deleting the nodes and the links are started. It is herein assumed that the user information as shown in FIG. 5 be given. The route designing unit searches if there are the sub-domains eligible for the site accommodation candidates ("1" is entered therein) in FIG. 27 and applicable to the delete condition (that the site accommodation node is not included), i.e., searches if there are not the sub-domains including none of the user site accommodation nodes in FIG. 5. The search target sub-domains are the sub-domains 1, 3, 4. In this case, however, none of the nodes N5, N7, N8 belonging to the sub-domain 4 are included in the base-point accommodation nodes in the user information, and consequently the sub-domain 4 is detected. The nodes and the links belonging to the detected sub-domain 4 are deleted from the design object. To be specific, the relay nodes N5, N7, N8 and the links 5-7, 5-8, 7-8, 2-5 are deleted.

After the deletion, the topology information becomes as shown in FIG. 28. If the user accommodation network design is conducted by use of the post-processing topology information, the labor needed for the route design can be reduced, and the required time can be largely decreased.

Embodiment 10

An embodiment 10 has, as compared with the embodiments 1 through 9 discussed above, a difference in terms of retaining pieces of information about different routes, and other configurations are the same. Therefore, the repetitive explanations of the same configurations as those in the embodiments 1 through 9 discussed above are omitted.

The basis of the route design is to perform the shortest route tree calculation. The Dijkstra algorithm in which "1" is set as each link cost is utilized as a shortest route tree algorithm.

According to the Dijkstra algorithm, a tree having a minimum cost from the root node Nr is uniquely determined. For example, if the topology information as shown in FIG. 14 is given in the network as illustrated in FIG. 13, when calculating the tree 1, a result as shown in FIG. 29A is acquired. In fact, however, there exists a tree as shown in FIG. 29B, both of these trees have the same cost from each node up to the root node. In this case, when processed by the Dijkstra algorithm with respect to the relay node N6, the relay node N2 and the relay node N5 are given as candidates for parent nodes having "2" as a cost to reach the root node. It can be arbitrarily set which node is selected. For instance, however, in the case of obtaining a plurality of parent node candidates having the same cost value, there is previously set such a rule that the candidate having the smaller value of the node ID be adopted and so forth, and the node N2 is adopted as the parent node in this case.

In the case of thus acquiring two parent nodes having the same cost value, one single node is adopted as the parent node, however, the other candidate as a surrogate parent node may retain a node ID. If three or more parent node candidates are acquired, one of remaining parent node candidates excluding one adopted node is properly selected. For example, a node candidate having the minimum value of node ID is selected.

FIG. 29C shows a processing result of the tree 1 in the case of adding information of the surrogate parent node to a processing result by the Dijkstra algorithm. If the surrogate parent node is acquired, a node ID thereof is retained in the surrogate parent node information. In this case, the node N2 is a parent node to the relay node N6. Then, there exists the relay node N5 as a parent node candidate exhibiting reachability to the root node Nr at the same cost "2", and therefore the node N5 is held as a surrogate parent node. Since none of the surrogate parent node candidates exist among the relay node N1 through N5, a value, e.g., "0" representing the non-existence is retained by way of a piece of surrogate parent node information.

On the occasion of executing the Dijkstra algorithm process, in the case of having a scheme of accommodating the user traffic by use of a route obtained as a result of the design by acquiring the surrogate parent node information described above, the traffic can not be accommodated at a specified relay node N for a reason such as deficiency of remaining bands on the route, and there arises a necessity of changing the route. In this case, it is searched if there exists any surrogate parent node that bypasses that link by referring to the surrogate parent node information of the tree including the this relay node N, and, if such a node exists, the parent node is replaced with this surrogate parent node, thus making a change to a different route having the same consumable band. This scheme eliminates a necessity of designing again from the beginning and enables the route design to be performed quickly.

It is presumed that the network management device 10 retains the topology information in FIG. 31 with respect to the network in FIG. 13. Herein, the route designing unit is to conduct the route design by, for instance, the method described in the embodiment 4. On the occasion of obtaining the evaluation values in the respective trees, the surrogate parent node information is to be acquired in the process of the Dijkstra algorithm calculation as described above. FIG. 30A-30D shows a result thereof. At this time, as in the aforementioned case, the assumption is that the relay node N1 is selected as a node having a minimum total evaluation value and that the bands are allocated as shown in FIG. 19. Herein, as illustrated in FIG. 31, the link 2-6 has a bandwidth that is as small as 5 Mbps (the bandwidth indicated herein may be either a physical bandwidth or a remaining band), and it is judged that the link 2-6 is incapable of accommodating the user traffic requiring an allocation of 10 Mbps. This judgment may be made by the route designing unit and may also be made and inputted by the operator.

Figure 32:
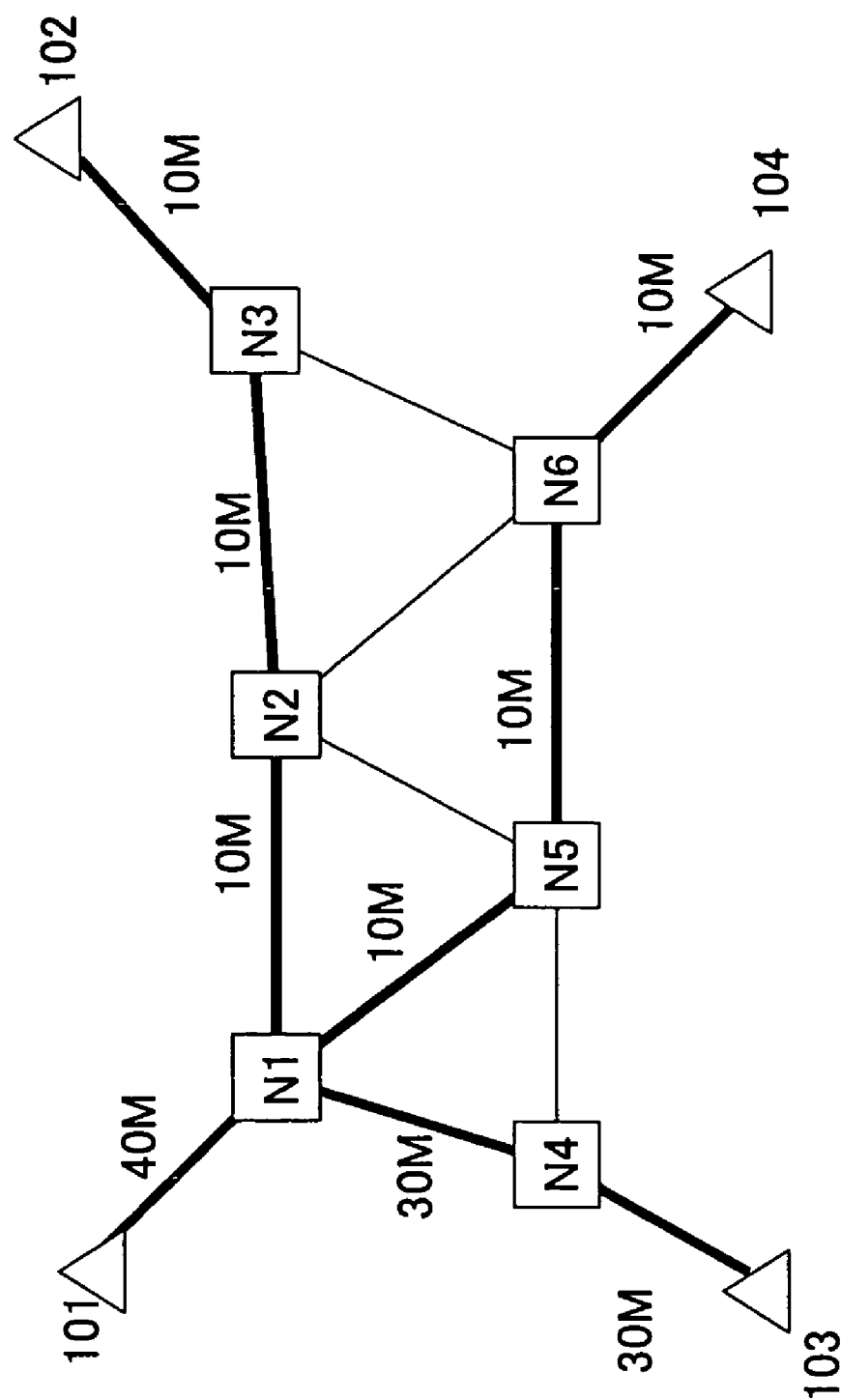
FIG. 32 is an explanatory view of a different route in an embodiment 10.

In the case of making the judgment of being incapable of accommodating this traffic, the route designing unit checks by use of the tree information in FIG. 30 whether or not there is a different route bypassing the link 2-6 and having the same consumable band. In this case, the route acquired is part of the tree of which the root node Nr is the relay node N1, and therefore the route designing unit checks by referring to the table of the tree 1 whether or not there is surrogate parent node information about the relay node N6 positioned downstream of the link 2-6. As a result, with respect to the relay node N6, the route designing unit selects the relay node N5 entered in the surrogate parent node information as a node reachable to the relay node N1 at the same cost, and obtains a route reaching the relay node N1 via the relay node N5. Accordingly, in conformity with the parent node information of the relay node N5, the route designing unit selects the link 5-6 and the link 1-5 as the route extending from the relay node N6 to the relay node N1, the deletes the link 2-6 from the present route information, and replaces it with information about the new route link 5-6, the node N5, the link 1-5 and the port thereof, thereby making it possible to obtain a route shown as a new route in FIG. 32, i.e., a different route having the same consumable band. A result of the design in FIG. 32 is expressed as in, for example, FIG. 34.

Embodiment 11

An embodiment 11 has, as compared with the embodiment 10 discussed above, a difference in terms of retaining the information about the design even after completing the route design, and other configurations are the same. Therefore, the repetitive explanations of the same configurations as those in the embodiment 10 discussed above are omitted.

In the embodiment 11, the route designing unit, when completing the route design, stores (retains) the tree information as the information about the design by the user on the storage unit 13, whereby the already-designed user route can be promptly changed afterwards. The tree information to be retained contains the surrogate parent node information as in the embodiment 10 discussed above.

It is presumed that the network management device 10 retains the topology information as shown in FIG. 35 for the network shown in FIG. 13. In the embodiment 11, the user information of the user 1 shown in FIG. 37A is accepted, and the route designing unit acquires a result of the designing as shown in FIG. 38A by performing the design as in the embodiment 4 discussed above. Note that A, it is assumed, be the VLANID assigned to the user 1. At this time, in the same way as done in the embodiment 10, the surrogate parent node information is acquired on the occasion of the Dijkstra algorithm calculation, and the tree information as shown in FIG. 38B is obtained. Herein, only the information about the tree 1 is described.

The route designing unit retains the result of the design in FIG. 38A and the tree information in FIG. 38B as design-related information of the user 1. For instance, a database for management of the user information may be built up in the storage unit 13, and the design-related information may be retained in this database or may also be stored on the memory.

The topology information is to be changed as shown in FIG. 36 because of having accommodated the user 1. FIG. 36 shows the topology information into which a quantity of the bandwidth allocated to the user 1 is subtracted from the topology information in FIG. 35.

Further, there is assumed a case where the user information of the user 2 shown in FIG. 37B is accepted. The route designing unit acquires pieces of information shown in FIGS. 38C and 38D as in the case of the user 1. Note that B is to be a VLANID assigned to the user 2. At this time, it can be understood from FIG. 36 that a must-be-allocated bandwidth to the user 2 is deficient in the link 2-6.

Herein, if the user 2 must take this route, or if a conflict thus occurs, the route designing unit changes the route for the user 1 in the case of setting a rule such as giving the priority to the most-updated route and so forth. To begin with, the route designing unit searches for a use who utilizes the link 2-6 from among the already-accommodated users and, if such a user exists, checks whether or not a route possible of bypassing the link 2-6 and having the same consumable bandwidth exists for this user.

In this case, the user 1 is detected, from the information in FIG. 38A, as the already-accommodated user who utilizes the link 2-6. Then, it is recognized from the tree information in FIG. 38B that there is a bypass route built up by the link 1-5, the relay node N5 and the link 5-6 as in the embodiment 10 discussed above, and the route for the user 1 is changed as shown in FIG. 39. Thus, the different route having the same consumable bandwidth exists for the user 1, and hence the route accommodating the user 1 is changed over to the now-acquired new route, whereby the topology information becomes as shown in FIG. 40. Consequently, the bandwidth of the link 2-6, which was deficient when in FIG. 36, becomes large enough to accommodate the user 2, whereby the user 2 can be accommodated without any trouble.

The invention is not limited to only the illustrative examples given above and can be, as a matter of course, modified in a variety of forms within the range that does not deviate the gist of the invention.

What is claimed is:

1. A route designing method of designing a communication route between user sites in a network management device connecting to a relay node in a network that connects user sites to each other through relay nodes and links, the method comprising steps of: accepting an input of user information containing information about a bandwidth of an access link serving as a link for connecting one of the user sites to the relay node; acquiring topology information of the network for relaying the communications between the user sites, wherein each of the user sites is a point through which traffic of a user flows into/out of the network; making each of the relay nodes set each of ports held by the each of the relay nodes up as a communication relay port or a communication non-relay port on the basis of a result of a route design in a way that refers to the user information and the topology information containing information about the each of the ports held by the each of the relay nodes; making each of the relay nodes set an upper limit of a communication bandwidth of the communication relay port; and performing the route design so that the user sites are connected by one of a plurality of shortest hop-by-hop routes, each of the shortest hop-by-hop routes being configured with a site accommodation node as the relay node connecting to corresponding one or more of the user sites via a corresponding access link, wherein the route design comprises: obtaining shortest route trees with site accommodation nodes each serving as a root node for a corresponding one of the shortest route trees, obtaining evaluation values of each of the site accommodation nodes with respect to the corresponding one of the shortest route trees based on (1) bands utilizable on the access link for connecting each corresponding user site to the relay nodes and (2) a number of relay nodes needed for reaching from the each corresponding user site, selecting one site accommodation node among the site accommodation nodes based on the obtained evaluation values, and determining a shortest hop-by-hop route for connecting the selected site accommodation node as the root node to each of the other site accommodation nodes with a minimum hop count.

2. A route designing method according to claim 1, wherein the route design is performed by allocating the upper limit of the communication bandwidth of an arbitrary port in each of relay nodes existing among the user sites, so as to be equal to or smaller than a sum of upper limits of communication bandwidths of other ports in the node to which the arbitrary port belongs.

3. A route designing method according to claim 1, wherein performing the route design involves obtaining a tree-shaped route with each relay node serving as a root, defining a condition indicating the communication non-relay node, and obtaining a communication route by excluding the relay nodes applicable to the condition from the relay nodes configuring the tree-shaped route.

4. A route designing method according to claim 2, wherein performing the route design involves obtaining a tree-shaped route with each relay node serving as a root, defining a condition indicating the communication non-relay node, excluding the relay nodes applicable to the condition from the relay nodes configuring the tree-shaped route, and allocating bands so as to minimize a total sum of the bands allocated to the respective links with respect to the tree-shaped route after the exclusion thereof.

5. A route designing method according to claim 1, wherein information about the tree-shaped route of which a root is the relay node capable of becoming the site accommodation node is previously acquired and stored, and is read out and thus utilized when conducting a route design.

6. A route designing method according to claim 3, wherein the route design is carried out after excluding, from a design object, the relay nodes that have a port count "1" and are not the user site accommodation nodes and all the links connected thereto.

7. A route designing method according to claim 3, wherein if the network is managed in a way that divides the network into sub-domains, the route design is carried out after excluding, from the design object, nodes belonging to the sub-domains including none of the relay nodes connecting to the user sites via the access link and also all the links connected thereto.

8. A route designing method according to claim 1, wherein if a different route reachable to the root node with the same relay count from an unspecified relay node is acquired on the occasion of obtaining the shortest hop-by-hop route, information about this different route is retained as information belonging to this node.

9. A route designing method according to claim 8, wherein after completing the route design, a result of the route design and the information about the different route are retained.

10. A route designing method according to claim 1, further comprising a step of transmitting, to the respective relay nodes, setting information containing information for specifying a port for relaying the communications between the user sites and information for indicating communication bands with respect to each relay node, and making the relay node set a route.

11. A non-transitory computer-readable storage medium recorded with a route designing program, operated on a network management device connecting to a relay node in a network that connects user sites to each other through relay nodes and links, for designing a communication route between user sites, the program making the network management device execute steps of: accepting an input of user information containing information about a bandwidth of an access link serving as a link for connecting one of the user sites to the relay node; acquiring topology information of the network for relaying the communications between the user sites, wherein each of the user sites is a point through which traffic of a user flows into/out of the network; making each of the relay nodes set each of ports held by the each of the relay nodes up as a communication relay port or a communication non-relay port on the basis of a result of a route design in a way that refers to the user information and the topology information containing information about the each of the ports held by the each of the relay nodes; making each of the relay nodes set an upper limit of a communication bandwidth of the communication relay port; and performing the route design so that the user sites are connected by one of a plurality of shortest hop-by-hop routes, each of the shortest hop-by-hop routes being configured with a site accommodation node as the relay node connecting to corresponding one or more of the user sites via a corresponding access link, wherein the route design comprises the steps of: obtaining shortest route trees with the site accommodation nodes each serving as a root node for a corresponding one of the shortest route trees, obtaining evaluation values of each of the site accommodation nodes with respect to the corresponding one of the shortest route trees based on (1) bands utilizable on the access link for connecting each corresponding user site to the relay nodes and (2) a number of relay nodes needed for reaching from the each corresponding user site, selecting one site accommodation node among the site accommodation nodes based on the obtained evaluation values, and determining a shortest hop-by-hop route for connecting the selected site accommodation node as the root node to each of the other site accommodation nodes with a minimum hop count.

12. A network management device connecting to a relay node in a network that connects user sites to each other through relay nodes and links, comprising: an input unit accepting an input of user information containing information about a bandwidth of an access link serving as a link for connecting one of the user sites to the relay node; a topology acquiring unit acquiring topology information of the network for relaying the communications between the user sites, wherein each of the user sites is a point through which traffic of a user flows into/out of the network; a route designing unit making each of the relay nodes set each of ports held by the each of the relay nodes up as a communication relay port or a communication non-relay port on the basis of a result of a route design in a way that refers to the user information and the topology information containing information about the each of the ports held by the each of the relay nodes; making each of the relay nodes set an upper limit of a communication bandwidth of the communication relay port; and performing the route design so that the user sites are connected by one of a plurality of shortest hop-by-hop routes, each of the shortest hop-by-hop routes being configured with a site accommodation node as the relay node connecting to corresponding one or more of the user sites via a corresponding access link, wherein the route design comprises the steps of: obtaining shortest route trees with the site accommodation nodes each serving as a root node for a corresponding one of the shortest route trees, obtaining evaluation values of each of the site accommodation nodes with respect to the corresponding one of the shortest route trees based on (1) bands utilizable on the access link for connecting each corresponding user site to the relay nodes and (2) a number of relay nodes needed for reaching from the each corresponding user site, selecting one site accommodation node among the site accommodation nodes based on the obtained evaluation values, and determining a shortest hop-by-hop route for connecting the selected site accommodation node as the root node to each of the other site accommodation nodes with a minimum hop count.

13. A network management device according to claim 12, wherein the route designing unit allocates the upper limit of the communication bandwidth of an arbitrary port in each of relay nodes existing among the user sites, so as to be equal to or smaller than a sum of upper limits of communication bandwidths of other ports in the node to which the arbitrary port belongs.

14. A network management device according to claim 12, wherein the route designing unit obtains a tree-shaped route with each relay node serving as a root, defines a condition indicating the communication non-relay node, and obtains a communication route by excluding the relay nodes applicable to the condition from the relay nodes configuring the tree-shaped route.

15. A network management device according to claim 13, wherein the route designing unit obtains a tree-shaped route with each relay node serving as a root, defines a condition indicating the communication non-relay node, excludes the relay nodes applicable to the condition from the relay nodes configuring the tree-shaped route, and allocates bands so as to minimize a total sum of the bands allocated to the respective links with respect to the tree-shaped route after the exclusion thereof.

16. A network management device according to claim 12, wherein the route designing unit previously obtains and stores information about the tree-shaped route of which a root is the relay node capable of becoming the site accommodation node, and reads and thus utilizes the information about the tree-shaped route when conducting a route design.

17. A network management device according to claim 14, wherein the route designing unit carries out the route design after excluding, from a design object, the relay nodes that have a port count "1" and are not the user site accommodation nodes and all the links connected thereto.

18. A network management device according to claim 14, wherein the route designing unit, if the network is managed in a way that divides the network into sub-domains, carries out the route design after excluding, from the design object, nodes belonging to the sub-domains including none of the relay nodes connecting to the user sites via the access link and also all the links connected thereto.

19. A network management device according to claim 12, wherein the route designing unit, if a different route reachable to the root node with the same relay count from an unspecified relay node is acquired on the occasion of obtaining the shortest hop-by-hop route, retains information about this different route as information belonging to this node.

20. A network management device according to claim 19, wherein the route designing unit, after completing the route design, retains a result of the route design and the information about the different route.

21. A network management device according to claim 12, further comprising a network setting unit transmitting, to the respective relay nodes, setting information containing information for specifying a port for relaying the communications between the user sites and information for indicating communication bands with respect to each relay node, and making the relay node set a route.

22. A network system comprising: a network for connecting user sites to each other through relay nodes and links; and a network management device connecting to the relay node, the network management device including: an input unit accepting an input of user information containing information about a bandwidth of an access link serving as a link for connecting one of the user sites to the relay node; a topology acquiring unit acquiring topology information of the network for relaying the communications between the user sites, wherein each of the user sites is a point through which traffic of a user flows into/out of the network; a route designing unit making each of the relay nodes set each of ports held by the each of the relay nodes up as a communication relay port or a communication non-relay port on the basis of a result of a route design in a way that refers to the user information and the topology information containing information about the each of the ports held by the each of the relay nodes; making each of the relay nodes set an upper limit of a communication bandwidth of the communication relay port; and performing the route design so that the user sites are connected by one of a plurality of shortest hop-by-hop routes, each of the shortest hop-by-hop routes being configured with a site accommodation node as the relay node connecting to corresponding one or more of the user sites via a corresponding access link, wherein the route design comprises the steps of: obtaining shortest route trees with the site accommodation nodes each serving as a root node for a corresponding one of the shortest route trees, obtaining evaluation values of each of the site accommodation nodes with respect to the corresponding one of the shortest route trees based on (1) bands utilizable on the access links for connecting each corresponding user site to the relay nodes and (2) a number of relay nodes needed for reaching from the each corresponding user site, selecting one site accommodation node among the site accommodation nodes based on the obtained evaluation values, and determining a shortest hop-by-hop route for connecting the selected site accommodation node as the root node to each of the other site accommodation nodes with a minimum hop count, the relay node including: an input unit accepting a traffic of the communication; an output unit outputting the traffic to a next node via the port; a setting acquisition unit receiving setting information from the network management device; and a setting unit setting a port of the output unit on the basis of the setting information.

\* \* \* \* \*